(12) United States Patent
Jia et al.

(10) Patent No.: US 11,902,192 B2
(45) Date of Patent: Feb. 13, 2024

(54) METHOD AND APPARATUS FOR DETERMINING POWER

(71) Applicant: FUJITSU LIMITED, Kawasaki (JP)

(72) Inventors: Meiyi Jia, Beijing (CN); Qinyan Jiang, Beijing (CN); Xin Wang, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 15 days.

(21) Appl. No.: 17/106,749

(22) Filed: Nov. 30, 2020

(65) Prior Publication Data

US 2021/0083822 A1    Mar. 18, 2021

Related U.S. Application Data

(63) Continuation of application No. PCT/CN2018/090477, filed on Jun. 8, 2018.

(51) Int. Cl.
| | |
|---|---|
| H04L 5/00 | (2006.01) |
| H04B 7/06 | (2006.01) |
| H04L 1/18 | (2023.01) |
| H04W 52/36 | (2009.01) |
| H04W 74/08 | (2009.01) |

(52) U.S. Cl.
CPC ......... H04L 5/0048 (2013.01); H04B 7/0626 (2013.01); H04L 1/18 (2013.01); H04W 52/367 (2013.01); H04W 74/0833 (2013.01)

(58) Field of Classification Search
CPC .. H04L 5/0048; H04W 52/146; H04W 52/36; H04W 52/362; H04W 52/367; H04W 74/004; H04W 74/0833
See application file for complete search history.

(56) References Cited

U.S. PATENT DOCUMENTS

| | | |
|---|---|---|
| 2017/0251460 A1 | 8/2017 | Agiwal et al. |
| 2018/0092129 A1 | 3/2018 | Guo et al. |
| 2018/0160448 A1 | 6/2018 | Blankenship et al. |
| 2018/0324716 A1* | 11/2018 | Jeon ................. H04W 74/0833 |
| 2018/0331728 A1* | 11/2018 | Tsai ................. H04W 74/0833 |
| 2019/0230646 A1 | 7/2019 | Li et al. |
| 2019/0274169 A1* | 9/2019 | Tsai .................... H04W 74/006 |
| 2019/0394805 A1* | 12/2019 | Kim ...................... H04W 52/50 |

(Continued)

FOREIGN PATENT DOCUMENTS

| | | |
|---|---|---|
| CN | 107888266 A | 4/2018 |
| CN | 107926034 A | 4/2018 |
| EP | 3 471 495 A1 | 4/2019 |

OTHER PUBLICATIONS

Examination Report issued by the Patent Office of India for corresponding Indian Patent Application No. 202037051028, dated Dec. 27, 2021, with an English translation.

(Continued)

Primary Examiner — Pao Sinkantarakorn
Assistant Examiner — Pawaris Sinkatarakom
(74) Attorney, Agent, or Firm — Myers Wolin, LLC

(57) ABSTRACT

A method and apparatus for determining power, in which whether to increase target received power is determined according to a change of either of a selected SSB and a selected CSI-RS. Hence, the selected CSI-RS is taken into account, and power is increased as necessary and useless retransmission is avoided, thereby increasing the success rate of random access and reducing power consumption of the UE.

18 Claims, 10 Drawing Sheets

(56) References Cited

U.S. PATENT DOCUMENTS

2020/0329503 A1* 10/2020 Da Silva ............. H04W 72/046
2020/0404595 A1* 12/2020 Ohara ................. H04W 52/362

OTHER PUBLICATIONS

Extended European search report with the supplementary European search report and the European search opinion, issued by the European Patent Office for corresponding European Patent Application No. 18921875.3-1205, dated Aug. 13, 2021.
Notice of Reasons for Refusal issued by the Japan Patent Office for corresponding Japanese Patent Application No. 2020-566946, dated Jan. 11, 2022, with an English translation.
Mediatek, "Summary on Beam Recovery Mechanism", Agenda Item: 6.2.2.4, 3GPP TSG-RAN WG1 Meeting NR AH#3, R1-1716767, Nagoya, Japan, Sep. 18-21, 2017.
Zte et al., "Remaining details of RACH procedure", Agenda Item: 6.1.4.2, 3GPP TSG-RAN WG1 Meeting NR#3, R1-1715382, Nagoya, Japan, Sep. 18-21, 2017.
Huawei et al., "Remaing issues on RA resource selection for multi-beam operations", Agenda Item: 10.3.1.4.2, 3GPP TSG-RAN WG2 Meeting #102, R2-1807973, Revision of R2-1805894, Busan, Korea, May 21-25, 2018.
3GPP TS 38.321 V15.1.0, "3rd Generation Partnership Project; Technical Specification Group Radio Access Network; NR; Medium Access Control (MAC) protocol specification (Release 15)", Mar. 2018.
Fujitsu, "Discussion on power ramping and power control during RA procedure", Agenda Item: 6.1.1.4.3, 3GPP TSG-RAN WG1 Meeting #90, R1-1712734, Prague, Czech Republic, Aug. 21-25, 2017.
Ericsson, "Preamble transmission power", Agenda Item: 10.3.1.4.4, 3GPP TSG-RAN WG2 Meeting #100, Tdoc R2-1713475, Reno, USA, Nov. 27-Dec. 1, 2017.
Huawei et al., "Corrections for 38321 for the RA resource selection", 3GPP TSG RAN WG2 Meeting #101bis, R2-1805895, Sanya, China, Apr. 16-20, 2018.
Vivo, "Remaining issues and text proposals on beam measurement and reporting", Agenda Item: 7.2.2.3, 3GPP TSG-RAN WG1 Meeting #AH 1801, R1-1800185, Vancouver, Canada, Jan. 22-26, 2018.
Zte et al., "CR for RACH parameters", 3GPP TSG-RAN WG2 Meeting #101bis, R2-1804403, Sanya, China, Apr. 16-20, 2018.
Communication pursuant to Rule 164(1) EPC with the partial supplementary European search report issued by the European Patent Office for corresponding European Patent Application No. 18921875.3, dated May 12, 2021.
Samsung, "Beamformed RA: Additional Power Ramping Aspects", Agenda Item: 10.3.1.4.2, 3GPP TSG-RAN WG2 Meeting #99bis, R2-1710078, Prague, Czech Republic, Oct. 9-13, 2017.
Samsung, "CF RA Resource Selection for BFR", Agenda item: 10.3.1.4.2, 3GPP TSG-RAN2 Meeting #101bis, R2-1804315, Sanya, China, Apr. 16-20, 2018.
Notice of Preliminary Rejection issued by the Korean Intellectual Property Office for corresponding Korean Patent Application No. 10-2020-7034450, dated Dec. 3, 2021, with an English translation.
International Search Report and Written Opinion of the International Searching Authority issued for the PCT application No. PCT/CN2018/090477, dated Feb. 20, 2019, with English translation.
Huawei et al."Random Access with Beam Operation"; Agenda Item:10.3.1.4.2; 3GPP TSG-RAN WG2 Meeting #99bis, R2-1710771, Oct. 9-13, 2017, Prague, Czech Republic.
Communication pursuant to Article 94(3) EPC issued by the European Patent Office for corresponding European Patent Application No. 18 921 875.3-1206, dated Mar. 16, 2023.
First Notification of Office Action and Search Report issued by the China National Intellectual Property Administration for corresponding Chinese Patent Application No. 201880094148.2, dated Apr. 18, 2023, with an English translation.
Second Notification of Office Action and Search Report issued by the China National Intellectual Property Administration for corresponding Chinese Patent Application No. 201880094148.2, dated Sep. 13, 2023, with an English translation.

* cited by examiner

METHOD AND APPARATUS FOR DETERMINING POWER

CROSS REFERENCE TO RELATED APPLICATIONS

This application is a continuation application of International Application No PCT/CN2018/090477 filed on Jun. 8, 2018, the contents of which are incorporated herein by reference.

TECHNICAL FIELD

This disclosure relates to the field of communications, and in particular to a method and apparatus for determining power.

BACKGROUND

In a random access (RA) procedure, a user equipment (UE) transmits message 1 (MSG1) to a network side to make a request for random access, and the network side transmits message 2 (MSG2) by broadcasting. In MSG2, the network side indicates a backoff time used by a UE that has not successfully received a random access response (RAR).

In addition, the random access procedure may be divided into contention-based random access (CBRA) and contention-free random access (CFRA). In CBRA, UEs share a random access preamble, therefore, random access conflicts may occur between multiple UEs; while in CFRA, network equipment may specify a random access preamble for a UE, there avoiding conflicts with the random access procedures of other UEs.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

In studies of new radio (NR) systems, at a media access control (MAC) layer, a random access (RA) procedure may include steps as follows: step 1: random access procedure initialization; step 2: selecting an SSB or a CSI-RS based on radio link quality of a configured synchronization signal block (SSB) and/or a channel state information reference signal (CSI-RS) and such factors as whether there exists a corresponding specified resource/preamble, etc., or selecting any SSB; step 3: selecting and/or using an RA resource corresponding to the selected SSB or CSI-RS to transmit a random access preamble corresponding to the selected SSB or CSI-RS; and step 4: for a UE succeeding in receiving a random access response (RAR), in case of the CBRA, completing the RA when the contention is resolved, and performing step 2 to select a resource and transmit a random access preamble when the contention is not resolved; in case of the CFRA, completing the RA; and for a UE having not succeeded receiving the RAR, performing step 2 to select a resource and transmit a random access preamble.

In each time of executing step 3, the MAC layer will instruct a lower layer target received power to which the random access preamble to be transmitted corresponds, so that a physical layer calculates transmitting power of the corresponding random access preamble.

In case of transmitting the random access preamble at another time, due to a power ramping mechanism, the target received power indicated by the MAC layer to the lower layer may be increased, so that uplink retransmission may be transmitted at power equal to or slightly higher than the previous transmission. This is not only advantageous to successful reception by the network side, but also causes less interference to other UEs. A counter related to the power ramping is used to determine whether the current transmission increases the target received power compared to the last transmission, i.e. PREAMBLE_POWER_RAMPING_COUNTER.

According to the current mechanism, from the perspective of resource selection, only when the selected SSB is not changed, can the counter related to the power ramping be incremented by 1, so that the target received power indicated to the lower layer will be increased. In other cases, the counter remains unchanged.

In addition, according to the current mechanism, in deciding whether to increment the counter related to power ramping by 1, the MAC layer also needs to consider whether a counter suspending notification is received from the physical layer. When this notification is received, the counter related to the power ramping remains unchanged. When the UE changes a spatial transmission filter before retransmission of a physical random access channel (PRACH) is performed, the physical layer will notify the MAC layer to suspend the counter related to power ramping, and transmit a counter suspending notification.

Therefore, when whether to increase the power is determined according to the current mechanism, following problems will occur: as the current mechanism only takes the selection of SSB into account, the power ramping will not be triggered as long as a CSI-RS is selected, no matter in a current random access resource selection process or in a last random access resource selection, CSI-RS and hence, the power for a current random access preamble transmission is identical to that as before. In extreme cases, when CSI-RS are selected in each time of retransmission of random access preambles, a power ramping mechanism cannot be applied in the process of retransmission of random access preambles, which may lead to useless retransmission, increase power consumption of the UE, and also cause the network side to fail in receiving the random access preamble correctly, and lower success rate of the random access.

Embodiments of this disclosure provide a method and apparatus for determining power, in which whether to increase target received power is determined according to a change of either of a selected SSB and a selected CSI-RS. Hence, the selected CSI-RS is taken into account, and power is increased as necessary and useless retransmission is avoided, thereby increasing the success rate of random access and reducing power consumption of the UE.

According to a first aspect of the embodiments of this disclosure, there is provided an apparatus for determining power, including: a first determining unit configured to determine whether to increase target received power according to a change of either of a selected synchronization signal block (SSB) and a selected channel state information reference signal (CSI-RS); wherein the selected SSB or the selected CSI-RS is used for determining a random access resource, and the target received power is used for determining transmitting power of a random access preamble.

According to a second aspect of the embodiments of this disclosure, there is provided an apparatus for determining power, including: a first configuring unit configured to configure UE with a counter related to power ramping commonly used by an SSB and a CSI-RS, or an SSB-specific counter related to power ramping and a CSI-RS specific counter related to power ramping; and/or a second configuring unit configured to configure the UE with a parameter used for calculating target received power and commonly used by the SSB and the CSI-RS, or an SSB-specific parameter used for calculating target received power and a CSI-RS specific parameter used for calculating target received power.

According to a third aspect of the embodiments of this disclosure, there is provided a UE, including the apparatus as described in the first aspect of the embodiments of this disclosure.

According to a fourth aspect of the embodiments of this disclosure, there is provided a network device, including the apparatus as described in the second aspect of the embodiments of this disclosure.

According to a fifth aspect of the embodiments of this disclosure, there is provided a communication system, including the UE as described in the third aspect of the embodiments of this disclosure and the network device as described in the fourth aspect of the embodiments of this disclosure.

According to a sixth aspect of the embodiments of this disclosure, there is provided a method for determining power, including: determining whether to increase target received power according to a change of either of a selected synchronization signal block (SSB) and a selected channel state information reference signal (CSI-RS); wherein the selected SSB or the selected CSI-RS is used for determining a random access resource, and the target received power is used for determining transmitting power of a random access preamble.

According to a seventh aspect of the embodiments of this disclosure, there is provided a method for determining power, including: configuring UE with a counter related to power ramping commonly used by an SSB and a CSI-RS, or an SSB-specific counter related to power ramping and a CSI-RS specific counter related to power ramping; and/or configuring the UE with a parameter used for calculating target received power and commonly used by the SSB and the CSI-RS, or an SSB-specific parameter used for calculating target received power and a CSI-RS specific parameter used for calculating target received power.

According to an eighth aspect of the embodiments of this disclosure, there is provided a computer readable program, which, when executed in an apparatus for determining power or a UE, will cause the apparatus for determining power or the UE to carry out the method for determining power as described in the sixth aspect.

According to a ninth aspect of the embodiments of this disclosure, there is provided a computer storage medium, including a computer readable program, which will cause an apparatus for determining power or a UE to carry out the method for determining power as described in the sixth aspect.

According to a tenth aspect of the embodiments of this disclosure, there is provided a computer readable program, which, when executed in an apparatus for determining power or a network device, will cause the apparatus for determining power or the network device to carry out the method for determining power as described in the seventh aspect.

According to an eleventh aspect of the embodiments of this disclosure, there is provided a computer storage medium, including a computer readable program, which will cause an apparatus for determining power or a network device to carry out the method for determining power as described in the seventh aspect.

An advantage of the embodiments of this disclosure exists in that whether to increase target received power is determined according to a change of either of a selected SSB and a selected CSI-RS. Hence, the selected CSI-RS is taken into account, and power is increased as necessary and useless retransmission is avoided, thereby increasing the success rate of random access and reducing power consumption of the UE.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings.

DETAILED DESCRIPTION

Figure 1:
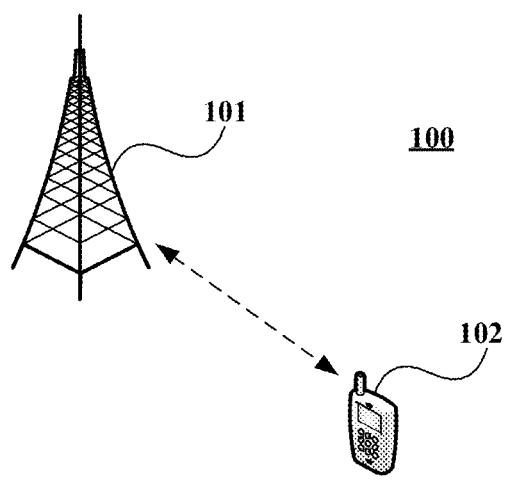
FIG. 1 is a schematic diagram of a communication system of an embodiment of this disclosure.

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, "multiple" or "a plurality of" refers to at least two.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G, and 5G and new radio (NR) in the future, etc., and/or other communication protocols that are currently known or will be developed in the future.

In the embodiments of this disclosure, the term "network device", for example, refers to an equipment in a communication system that accesses a terminal equipment to the communication network and provides services for the terminal equipment. The network device may include but not limited to the following equipment: a base station (BS), an access point (AP), a transmission reception point (TRP), a broadcast transmitter, a mobile management entity (MME), a gateway, a server, a radio network controller (RNC), a base station controller (BSC), etc.

The base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico). The term "base station" may include some or all of its functions, and each base station may provide communication coverage for a specific geographical area. And a term "cell" may refer to a base station and/or its coverage area, which is dependent on a context of the term.

In the embodiments of this disclosure, the term "user equipment (UE)" of "terminal equipment (TE)" refers to, for example, equipment accessing to a communication network and receiving network services via a network device. The user equipment may be fixed or mobile, and may also be referred to as a mobile station (MS), a terminal, a subscriber station (SS), an access terminal (AT), or a station, etc.

The user equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

Scenarios in the embodiments of this disclosure shall be described below by way of examples; however, this disclosure is not limited thereto.

FIG. 1 is a schematic diagram of a communication system of an embodiment of this disclosure, in which a case where a user equipment and a network device are taken as examples is schematically shown. As shown in FIG. 1, the communication system 100 may include a network device 101 and a user equipment 102. For the sake of simplicity, description is given in FIG. 1 by taking one user equipment as an example; however, the embodiment of this disclosure is not limited to one user equipment.

In the embodiment of this disclosure, existing traffics or traffics that may be implemented in the future may be performed between the network device 101 and the user equipment 102. For example, such traffics may include but not limited to enhanced mobile broadband (eMBB), massive machine type communication (MTC), and ultra-reliable and low-latency communication (URLLC).

Embodiment 1

The embodiment of this disclosure provides a method for determining power, applicable to a UE side.

Figure 2:
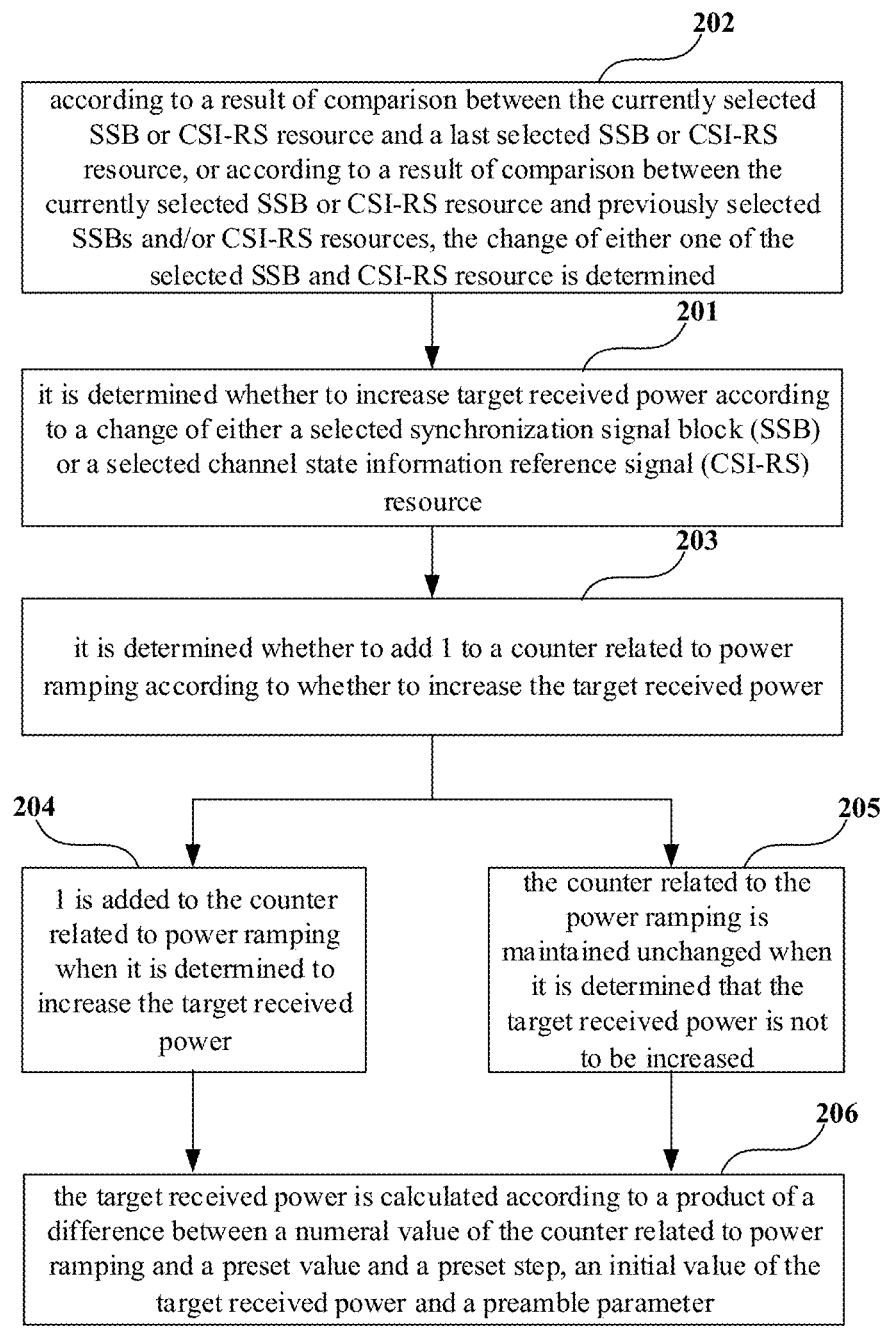
FIG. 2 is a schematic diagram of the method for determining power of Embodiment 1 of this disclosure.

FIG. 2 is a schematic diagram of the method for determining power of Embodiment 1 of this disclosure. As shown in FIG. 2, the method includes:

Step 201: it is determined whether to increase target received power according to a change of either of a selected synchronization signal block (SSB) and a selected channel state information reference signal (CSI-RS);

the selected SSB or the selected CSI-RS is used for determining a random access resource, and the target received power is used for determining transmitting power of a random access preamble.

Hence, whether to increase target received power is determined according to a change of either of a selected SSB and a selected CSI-RS. Hence, the selected CSI-RS is taken into account, and power is increased as necessary and useless retransmission is avoided, thereby increasing the success rate of random access and reducing power consumption of the UE.

In this embodiment, the selected SSB or the selected CSI-RS may be, for example, an SSB or a CSI-RS selected based on wireless channel quality of a configured SSB and/or a CSI-RS and such factors as whether there exists a corresponding specified resource/preamble, etc., or an SSB selected arbitrarily.

In this embodiment, a purpose of selecting the SSB or the CSI-RS is to determine an RA resource corresponding to the selected SSB or CSI-RS and an index of the random access preamble, and the user equipment may transmit a random access preamble indicated by the index by using the RA resource.

In this embodiment, the SSB or CSI-RS and the RA resource and the index of the random access preamble may have a mapping relationship. For example, the mapping relationship may be preconfigured by the network device side for the user equipment.

In this embodiment, the target received power is used to determine the transmission power of the random access preamble, that is, the power at which the user equipment transmits the random access preamble.

For example, the user equipment transmits the random access preamble by using a smaller one between maximum power $P_{CMAX,f,c}(i)$ configured by the network device side and (target received power+pathloss). For example, the target received power may be notified by an MAC layer, and the pathloss may be obtained by subtracting reference signal received power (RSRP) provided by system information by a value of received power of a reference signal filtered by a higher layer.

In this embodiment, the change of either one of the selected SSB and CSI-RS may include: a change of a type of the selected resource, and/or a change of a specific physical resource configured for the selected resource.

In this embodiment, in determining the change of either one of the selected SSB and CSI-RS, a currently selected SSB or CSI-RS may be compared with a previous selection result, or an SSB or CSI-RS selected next to a currently selected SSB or CSI-RS may be compared with all previous selection results.

For example, the method may further include:

Step 202: according to a result of comparison between the currently selected SSB or CSI-RS and a last selected SSB or CSI-RS, or according to a result of comparison between the currently selected SSB or CSI-RS and previously selected SSBs and/or CSI-RS, the change of either one of the selected SSB and CSI-RS is determined.

For example, the change of either one of the selected SSB and CSI-RS is determined according to the type of the currently selected SSB or CSI-RS and a result of comparison between types of configured physical resources and a resource selected last time and the configured physical resources, or according to the type of the currently selected SSB or CSI-RS and a result of comparison between types of configured physical resources and all resources selected previously and the configured physical resources.

In this embodiment, the type of the selected SSB or CSI-RS refers to whether an SSB or a CSI-RS is selected, that is, the SSB and the CSI-RS belong to different types of resources.

In this embodiment, the configured physical resources refer to physical resources specifically configured for the SSB or CSI-RS, such as which frequencies and/or which symbols or slots the physical resources configured for the selected SSB are, and which frequencies and/or which symbols or slots the physical resources configured for the selected CSI-RS are.

In this embodiment, determining whether the physical resources configured for the SSB or CSI-RS are identical may be performed according to whether indices of SSBs or IDs of CSI-RS are identical, that is, SSBs with different indices are configured with different physical resources, and CSI-RS with different IDs are also configured with different physical resources.

In this example, SSBs with different indices are briefly referred to as different SSBs, and CSI-RS with different IDs are briefly referred to as different CSI-RS. That is to say, different SSBs are configured with different physical resources, and different CSI-RS are also configured with different physical resources.

How to determine the change of either one of the selected SSB and CSI-RS according to a result of comparison in step 202 shall be illustrated below.

First, a case where an SSB is currently selected shall be explained.

For example, when an SSB is currently selected, an SSB is previously selected, and the two SSBs are identical, it is determined that the selected SSB is not changed.

For example, when an SSB is currently selected, and the currently selected SSB is identical to one of all previously selected SSBs, it is determined that the selected SSB is not changed.

For example, when an SSB is currently selected, a CSI-RS is previously selected, and the currently selected SSB is identical to an SSB quasi co-located with the previously selected CSI-RS, it is determined that the selected SSB is not changed.

For example, when an SSB is currently selected, and the currently selected SSB is identical to an SSB quasi co-located with one of all previously selected CSI-RS, it is determined that the selected SSB is not changed.

For example, when an SSB is currently selected, for other cases than the above examples, it may be determined that the selected SSB is changed.

Second, a case where a CSI-RS is currently selected shall be explained.

For example, when a CSI-RS is currently selected, a CSI-RS is previously selected, and the two CSI-RS are identical, it is determined that the selected CSI-RS is not changed.

For example, when a CSI-RS is currently selected, and the currently selected CSI-RS is identical to one of all previously selected CSI-RS, it is determined that the selected CSI-RS is not changed.

For example, when a CSI-RS is currently selected, an SSB is previously selected, and an SSB quasi co-located with the currently selected CSI-RS is identical to a previously selected SSB, it is determined that the selected CSI-RS is not changed.

For example, when a CSI-RS is currently selected, for other cases than the above examples, it may be determined that the selected CSI-RS is changed.

In this embodiment, for some cases, when a quasi co-location relationship between a CSI-RS and an SSB is or is not taken into account, results of determining whether the selected CSI-RS is changed may possibly be different.

For example, in a case where a CSI-RS is currently selected, a CSI-RS is previously selected, and the two CSI-RS are different, but an SSB quasi co-located with the currently selected CSI-RS is identical to an SSB quasi co-located with the previously selected CSI-RS, when the quasi co-location relationship between a CSI-RS and an SSB is taken into account, it may be determined that the selected CSI-RS is not changed, or it may also be determined that the selected CSI-RS is changed, and when the quasi co-location relationship between a CSI-RS and an SSB is not taken into account, it may be determined that the selected CSI-RS is changed.

For another example, in a case where a CSI-RS is currently selected, and the currently selected CSI-RS is different from all previously selected CSI-RS, but an SSB quasi co-located with the currently selected CSI-RS is identical to an SSB quasi co-located with at least one of all the previously selected CSI-RS, when the quasi co-location relationship between a CSI-RS and an SSB is taken into account, it may be determined that the selected CSI-RS is not changed, or it may also be determined that the selected CSI-RS is changed, and when the quasi co-location relationship between a CSI-RS and an SSB is not taken into account, it may be determined that the selected CSI-RS is changed.

In this embodiment, for the above-mentioned two cases, in determining whether the selected CSI-RS is changed, whether the quasi co-location relationship between a CSI-RS and an SSB is taken into account and a rule for determination when the quasi co-location relationship is taken into account may be pre-defined, or may be pre-configured by the network device side.

A particular method for determining whether to increase the target received power according to a change of either one of the selected SSB and CSI-RS corresponding to steps 202 and 201 shall be illustrated below.

For example, in the case that either one of the selected SSB and CSI-RS is not changed, it is determined to increase the target received power.

In this way, the transmission power of the retransmitted random access preamble is increased when the selected SSB or CSI-RS is not changed, which may reasonable use the power ramping mechanism, and improve the success rate of random access.

Respective conditions for determining increasing the target received power and not increasing the target received power shall be described below by way of examples.

For example, solution 1: determining not to increase the target received power when the selected SSB is changed, and determining to increase the target received power in other cases than that where the selected SSB is changed.

In this way, a reasonable processing may be performed in the case where the CSI-RS is currently selected and is not changed, that is, power ramping is performed.

For example, solution 2: determining to increase the target received power when either one of the selected SSB and CSI-RS is not changed, and determining not to increase the target received power in other cases than that where either one of the selected SSB and CSI-RS is not changed.

In this way, for the case where the same resource is selected currently and previously, for example, an SSB or a CSI-RS is selected currently and previously, reasonable processing may be performed.

For example, solution 3: determining not to increase the target received power when either one of the selected SSB and CSI-RS is changed, and determining to increase the target received power in other cases than that where either one of the selected SSB and CSI-RS is changed.

In this way, for the case where the same resource is selected currently and previously, for example, an SSB or a CSI-RS is selected currently and previously, reasonable processing may be performed.

For example, solution 4: determining not to increase the target received power when the selected SSB is changed or an SSB quasi co-located with the selected CSI-RS is changed, and determining to increase the target received power in other cases than that where the selected SSB is changed or an SSB quasi co-located with the selected CSI-RS is changed.

In this way, the quasi co-location relationship between a CSI-RS and an SSB is taken into account, so that no matter what type of resources are currently selected, reasonable processing may be performed.

In this embodiment, for solution 2, for example, in a case where a type of the selected SSB is changes or a type of the selected CSI-RS is changed, or a type of the selected SSB or CSI-RS is not changed but the selected physical resource is changed, it is determined not to increase the target received power.

In this embodiment, the type of the selected SSB or CSI-RS refers to whether an SSB or a CSI-RS is selected, that is, the SSB and CSI-RS belong to different types of resources. For example, when an SSB is currently selected, and a CSI-RS is selected previously, the type of the selected SSB is changed.

In this embodiment, the configured physical resource refers to a physical resource specifically configured for the SSB or CSI-RS, such as which frequencies and/or which symbols or slots the physical resources configured for the selected SSB are, and which frequencies and/or which symbols or slots the physical resources configured for the selected CSI-RS are. For example, when an SSB is currently selected, and an SSB is previously selected, but physical resources configured for these SSBs are different, a type of the selected SSB is not changed, but a type of the physical resource is changed.

In this way, when the type of the selected resource is changed or the type of the selected resource is not changed but the physical resource is changed, the power is not increased, thereby reducing unnecessary power consumption of the user equipment.

In step 201, whether the target received power is increased is determined according to the change of either one of the selected SSB and CSI-RS. After whether the target received power is increased is determined, the method may further include:

Step 203: it is determined whether to increment a counter related to power ramping by 1 according to whether to increase the target received power;

Step 204: 1 is added to the counter related to power ramping when it is determined to increase the target received power; and Step 205: the counter related to the power ramping is maintained unchanged when it is determined that the target received power is not to be increased.

In steps 203-205, increasing the target received power may be achieved in various ways. For example, increasing the target received power may be achieved by adding 1 to a power-related counter. According to whether to increase the target received power, whether adding 1 to the counter related to the power ramping is determined, and the counter is added by 1 or the counter is maintained unchanged according to a result of determination.

That is to say, the counter related to the power ramping is maintained according to whether to increase the target received power, and realize increasing or not increasing the target received power. When the counter is added by 1, the target received power is increased, and when the counter is unchanged, the target received power is not increased.

In this embodiment, it may also be that in step 201, whether the power-related counter is added by 1 is directly determined according to the change of either one of the selected SSB and CSI-RS. For example, it may be that the counter is maintained unchanged when either one of the selected SSB and CSI-RS is changed, otherwise, the counter is added by 1.

That is to say, whether the power-related counter is added by 1 is determined according to the change of either one of the selected SSB and CSI-RS.

In this embodiment, the counter related to power ramping may be a counter related to power ramping commonly used by an SSB and a CSI-RS, such as PREAMBLE_POWER_RAMPING_COUNTER; and it may also be an SSB-specific counter related to power ramping, such as PREAMBLE_POWER_RAMPING_COUNTER_SSB, and/or, a CSI-RS-specific counter related to power ramping, such as PREAMBLE_POWER_RAMPING_COUNTER_CSIRS. For example, which type of counter is to be used may be configured by the network device side.

For example, in the case of determining to increase the target received power, when a counter related to power ramping commonly used by an SSB and a CSI-RS is configured, the counter related to power ramping commonly used by SSB and CSI-RS is added by 1;

and when an SSB-specific counter related to power ramping and/or a CSI-RS-specific counter related to power ramping is/are configured, when an SSB is currently selected, the SSB-specific counter related power ramping is added by 1, and when a CSI-RS is currently selected, the CSI-RS-specific counter related to power ramping is added by 1.

In this embodiment, the counter related to power ramping is maintained in steps 203-205, and thereafter, the method may further include:

Step 206: the target received power is calculated according to a product of a difference between a numeral value of the counter related to power ramping and a preset value and a preset step, an initial value of the target received power and a preamble parameter.

In step 206, methods for calculating the target received power may be different as counters related to power ramping used by the user equipment are different.

For example, when a counter related to power ramping commonly used by an SSB and a CSI-RS is used, the target received power may be calculated according to formula (1) as below:

Target received power=preambleReceivedTargetPower+DELTA_PREAMBLE+(PREAMBLE_POWER_RAMPING_COUNTER−1)×preamblePowerRampingStep  (1);

where, preambleReceivedTargetPower denotes the initial value of the target received power, DELTA_PREAMBLE denotes the preamble parameter, PREAMBLE_POWER_RAMPING_COUNTER denotes the numeral value of the counter related to power ramping commonly used by an SSB and a CSI-RS, 1 denotes that the preset value is 1, and preamblePowerRampingStep denotes the preset step.

In this embodiment, the initial value of the target received power, the preamble parameter and the preset step may be pre-configured by the network device side.

For example, when an SSB-specific counter related to power ramping or a CSI-RS-specific counter related to power ramping is used, the target received power may be calculated according to formula (2) as below:

Target received power=preambleReceivedTargetPower+DELTA_PREAMBLE+(PREAMBLE_POWER_RAMPING_COUNTER_*SSB*+PREAMBLE_POWER_RAMPING_COUNTER_CSIRS−k)×preamblePowerRampingStep  (2);

where, preambleReceivedTargetPower denotes the initial value of the target received power, DELTA_PREAMBLE denotes the preamble parameter, PREAMBLE_POWER_RAMPING_COUNTER_SSB denotes the numeral value of the SSB-specific counter related to power ramping, PREAMBLE_POWER_RAMPING_COUNTER_CSIRS denotes the numeral value of the CSI-RS-specific counter related to power ramping, k denotes that the preset value is k, and preamblePowerRampingStep denotes the preset step.

In this embodiment, the initial value of the target received power, the preamble parameter and the preset step may be pre-configured by the network device side.

In this embodiment, when an SSB-specific counter related to power ramping and a CSI-RS-specific counter related to power ramping are configured by the network device, the user equipment may use both or one of the two counters.

In this embodiment, when the SSB-specific counter related to power ramping and the CSI-RS-specific counter related to power ramping are used, the preset value may be determined according to the number of used resource-specific counters related to power ramping, the initial value of the SSB-specific counter related to power ramping and/or the initial value of the CSI-RS-specific counter related to power ramping.

For example, some exemplary situations are enumerated below.

1) when the SSB-specific counter related to power ramping is only used and the initial value of the counter is 1, the preset value is 1;
2) when the CSI-RS-specific counter related to power ramping is only used and the initial value of the counter is 1, the preset value is 1;
3) when both the SSB-specific counter related to power ramping and the CSI-RS-specific counter related to power ramping are used and the initial values thereof are both 1, the preset value is 2;
4) when the SSB-specific counter related to power ramping is only used and the initial value of the counter is 0, the preset value is 0;
5) when the CSI-RS-specific counter related to power ramping is only used and the initial value of the counter is 0, the preset value is 0;
6) when both the SSB-specific counter related to power ramping and the CSI-RS-specific counter related to power ramping are used and the initial values thereof are both 0, the preset value is 0;
7) when both the SSB-specific counter related to power ramping and the CSI-RS-specific counter related to power ramping are used, the initial value of the SSB-specific counter related to power ramping is 0 and the initial value of the CSI-RS-specific counter related to power ramping is 1, the preset value is 1;
8) when both the SSB-specific counter related to power ramping and the CSI-RS-specific counter related to power ramping are used, the initial value of the SSB-specific counter related to power ramping is 1 and the initial value of the CSI-RS-specific counter related to power ramping is 0, the preset value is 1.

In step 206, a parameter commonly used by the SSB and CSI-RS or a parameter specific for the SSB or CSI-RS may further be used to calculate the target received power.

For example, the target received power may be calculated according to a product of the difference between the numeral value of the counter related to power ramping and the preset value and a preset step specific for the SSB or CSI-RS or commonly used by the SSB and CSI-RS, an initial value of the target received power specific for the SSB or the CSI-RS or commonly used by them and a preamble parameter specific for the SSB or the CSI-RS or commonly used by them.

For example, regardless of whether the SSB or the CSI-RS is currently selected, the target received power is calculated according to above formula (1).

For another example, the target received power is calculated by using a parameter specific for the currently selected resource.

For example, in the case where the SSB is currently selected, the target received power may be calculated by using formula (3) as below:

$$\text{Target received power} = \text{preambleReceivedTargetPower\_SSB} + \text{preambleReceivedTargetPower\_SSB} + \text{DELTA\_PREAMBLE\_SSB} + (\text{PREAMBLE\_POWER\_RAMPING\_COUNTER} - 1) \times \text{preamblePowerRampingStep\_SSB} \quad (3);$$

where, preambleReceivedTargetPower_SSB denotes the initial value of the SSB-specific target received power, DELTA_PREAMBLE_SSB denotes the SSB-specific preamble parameter, PREAMBLE_POWER_RAMPING_COUNTER denotes the numeral value of the counter related to power ramping, 1 denotes that the preset value is 1, and preamblePowerRampingStep_SSB denotes the SSB-specific preset step.

In this embodiment, the initial value of the SSB-specific target received power, the preamble parameter and the preset step may be pre-configured by the network device side.

For example, in the case where the CSI-RS is currently selected, the target received power may be calculated by using formula (4) as below:

$$\text{Target received power} = \text{preambleReceivedTargetPower\_CSIRS} + \text{DELTA\_PREAMBLE\_CSIRS} + (\text{PREAMBLE\_POWER\_RAMPING\_COUNTER} - 1) \times \text{preamblePowerRampingStep\_CSIRS} \quad (4);$$

where, preambleReceivedTargetPower_CSIRS denotes the initial value of the CSI-RS-specific target received power, DELTA_PREAMBLE_CSIRS denotes the CSI-RS-specific preamble parameter, PREAMBLE_POWER_RAMPING_COUNTER denotes the numeral value of the counter related to power ramping, 1 denotes that the preset value is 1, and preamblePowerRampingStep_CSIRS denotes the CSI-RS-specific preset step.

In this embodiment, the initial value of the CSI-RS-specific target received power, the preamble parameter and the preset step may be pre-configured by the network device side.

In this embodiment, steps 202-206 are optional.

Figure 3:
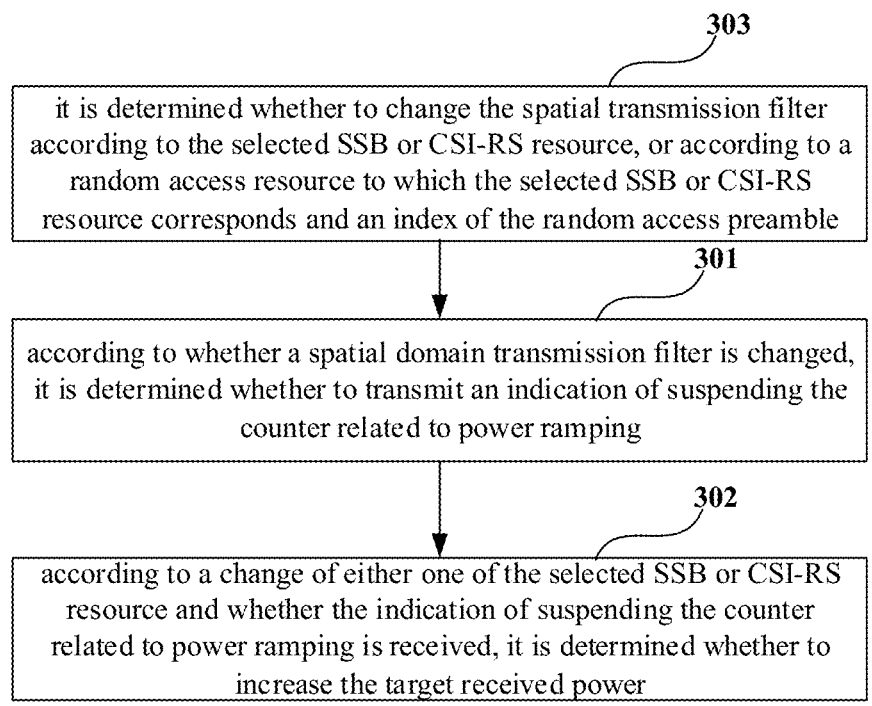
FIG. 3 is another schematic diagram of the method for determining power of Embodiment 1 of this disclosure.

FIG. 3 is another schematic diagram of the method for determining power of Embodiment 1 of this disclosure. As shown in FIG. 3, the method includes:

Step 301: according to whether a spatial domain transmission filter is changed, it is determined whether to transmit a notification of suspending the counter related to power ramping; and Step 302: according to a change of either one of the selected SSB or CSI-RS and whether the notification of suspending the counter related to power ramping is received, it is determined whether to increase the target received power.

In step 301, when a physical layer changes the spatial transmission filter, it transmits the notification of suspending the counter related to power ramping to an MAC layer, and when the physical layer does not change the spatial transmission filter, the notification of suspending is not transmitted.

In step 302, when the MAC layer receives the notification of suspending, it maintains the counter related to power ramping unchanged, that is, the target received power is not increased; and when the MAC layer does not receive the notification of suspending, it determines whether to increase the target received power according to the change of either one of the selected SSB and CSI-RS. A particular method for determination is identical to step 201 in FIG. 2, which shall not be described herein any further.

In this embodiment, the method may further include:

Step 303: it is determined whether to change the spatial transmission filter according to the selected SSB or CSI-RS, or according to a random access resource to which the selected SSB or CSI-RS corresponds and an index of the random access preamble.

In this embodiment, step 303 is optional.

For example, in a case of retransmission of the random access preamble, or in a case of initial transmission or retransmission of the random access preamble, before the MAC layer starts to perform a random access preamble transmission process, the MAC layer transmits the index of the selected SSB or an ID of the selected CSI-RS or an index of the SSB quasi co-located with the selected CSI-RS to the physical layer, or the MAC layer transmits the random access resource to which the selected SSB or CSI-RS corresponds and the index of the random access preamble to the physical layer.

In addition, when the MAC layer has completed the random access preamble transmission process, it may no longer provide the above information to the physical layer and only provide the target received power. And furthermore, when there exists an RA-RNTI, such information is also provided.

In this way, the following problems existing in the related art may be solved: in a case where there exists reciprocity between an uplink wireless status and a downlink wireless status, the spatial transmission filter is associated with a resource selected by the MAC layer. Based on interaction between a current physical layer and the MAC layer, the physical layer does not learn a result of resource selection by the MAC layer in determining the spatial transmission filter. This may cause the physical layer to erroneously provide a notification of suspending for the MAC layer, or erroneously fail to provide a notification of suspending for the MAC layer, resulting in a wrong decision on whether to increase power.

That is to say, it is possible to provide a notification of suspending for the MAC layer reasonably, so as to reasonably decide whether to increase power.

It can be seen from the above embodiment that whether to increase target received power is determined according to a change of either of a selected SSB and a selected CSI-RS. Hence, the selected CSI-RS is taken into account, and power is increased as necessary and useless retransmission is avoided, thereby increasing the success rate of random access and reducing power consumption of the UE.

Embodiment 2

The embodiment of this disclosure provides a method for determining power, applicable to a UE side.

Figure 4:
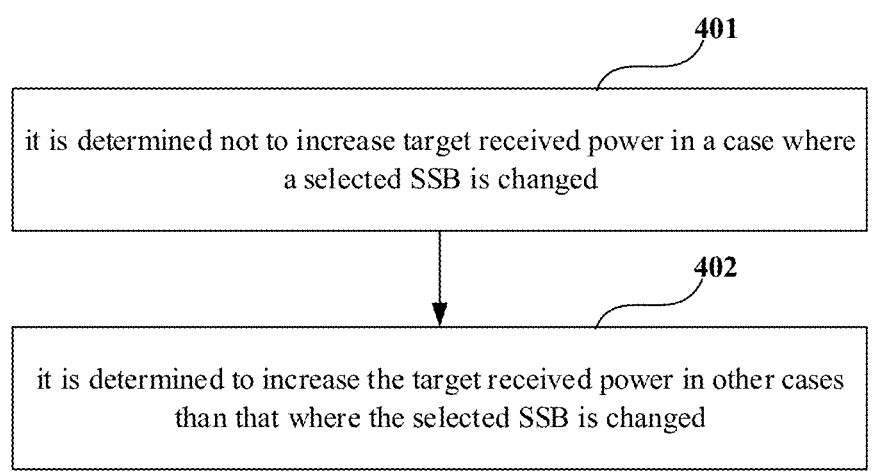
FIG. 4 is a schematic diagram of the method for determining power of Embodiment 2 of this disclosure.

FIG. 4 is a schematic diagram of the method for determining power of Embodiment 2 of this disclosure. As shown in FIG. 4, the method includes:

Step 401: it is determined not to increase target received power in a case where a selected SSB is changed;

Step 402: it is determined to increase the target received power in other cases than that where the selected SSB is changed.

In this embodiment, in determining whether a selected CSI-RS is changed, a quasi-co-location relationship between the CSI-RS and the SSB is not taken into account.

In this embodiment, the selected SSB being changed indicates that the SSB is currently selected. For the case where the selected SSB is changed, reference may be made to what is described in Embodiment 1.

For example, the case where the selected SSB is changed may include any one of the following cases:

1) an SSB is currently selected, and an SSB is selected last time, but the two SSBs are different;
2) an SSB is currently selected, and CSI-RS is selected last time;
3) an SSB is currently selected, and the currently selected SSB is different from all previously selected SSBs.

In this embodiment, the methods for increasing the target received power and not increasing the target received power may be identical to those described in Embodiment 1, that is, whether a counter related to power ramping is added by 1 is determined according to whether the target received power is increased, and whether the counter is added by 1 or the counter is maintained unchanged is determined according to a result of determination.

In addition, a counter or parameter used in the method for calculating the target received power may be identical to that described in Embodiment 1, which shall not be described herein any further.

In addition, the method of this embodiment may further include steps of determining a notification of suspending the counter, and determining whether to increase the target received power according to the change of either one of the selected SSB and CSI-RS and whether the notification of suspending is received. A particular implementation method is identical to that described in Embodiment 1, which shall not be described herein any further.

It can be seen from the above embodiment that whether to increase target received power is determined according to a change of either of a selected SSB and a selected CSI-RS. Hence, the selected CSI-RS is taken into account, and power is increased as necessary and useless retransmission is avoided, thereby increasing the success rate of random access and reducing power consumption of the UE. And furthermore, the case where a CSI-RS is currently selected and is not changed may be reasonably processed, that is, power ramping is performed.

Embodiment 3

The embodiment of this disclosure provides a method for determining power, applicable to a UE side.

Figure 5:
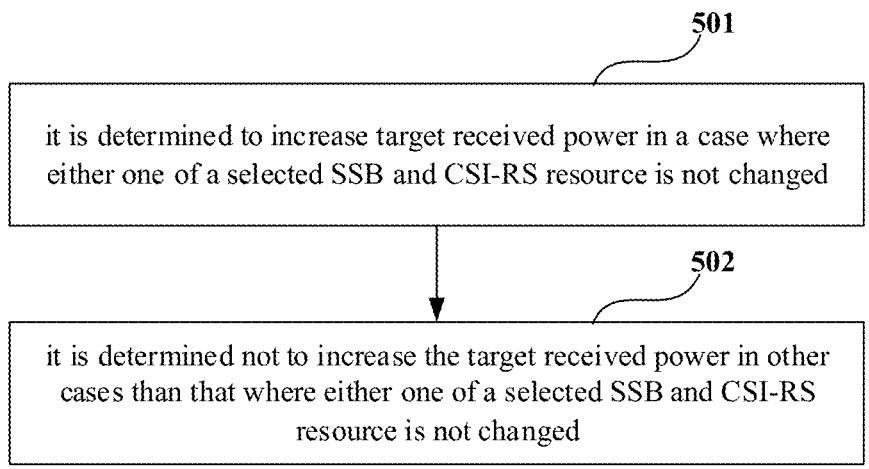
FIG. 5 is a schematic diagram of the method for determining power of Embodiment 3 of this disclosure.

FIG. 5 is a schematic diagram of the method for determining power of Embodiment 3 of this disclosure. As shown in FIG. 5, the method includes:

Step 501: it is determined to increase target received power in a case where either one of a selected SSB and CSI-RS is not changed; and Step 502: it is determined not to increase the target received power in other cases than that where either one of a selected SSB and CSI-RS is not changed.

In this embodiment, in determining whether a selected CSI-RS is changed, a quasi-co-location relationship between the CSI-RS and the SSB is not taken into account.

In this embodiment, for the case where either one of a selected SSB and CSI-RS is not changed, reference may be made to what is described in Embodiment 1.

For example, the case where either one of a selected SSB and CSI-RS is not changed may include any one of the following cases:

1) an SSB is currently selected, an SSB is selected last time, and the two SSBs are identical;
2) an SSB is currently selected, and the currently selected SSB is identical to at least one of previously selected SSBs;
3) a CSI-RS is currently selected, a CSI-RS is selected last time, and the two CSI-RS are identical; and
4) a CSI-RS is currently selected, and the currently selected CSI-RS is identical to at least one of previously selected CSI-RS.

In this embodiment, the methods for increasing the target received power and not increasing the target received power may be identical to those described in Embodiment 1, that is, whether a counter related to power ramping is added by 1 is determined according to whether the target received power is increased, and whether the counter is added by 1 or the counter is maintained unchanged is determined according to a result of determination.

In addition, a counter or parameter used in the method for calculating the target received power may be identical to that described in Embodiment 1, which shall not be described herein any further.

In addition, the method of this embodiment may further include steps of determining a notification of suspending the counter, and determining whether to increase the target received power according to the change of either one of the selected SSB and CSI-RS and whether the notification of suspending is received. A particular implementation method is identical to that described in Embodiment 1, which shall not be described herein any further.

The method of this embodiment shall be illustrated below for a scenario of switch.

In the case of switch, the network device may possibly only provide a specified random access resource and a random access preamble to which the CSI-RS corresponds for the user equipment, in which case CSI-RS satisfying radio link quality conditions will be selected preferentially. In this way, in all resource selection processes, it is a conventional situation that only CSI-RS are selected and SSBs are not selected.

For example, in initial transmission of the random access preamble, a CSI-RS with CSI-RS ID=3 is selected. In a first time of retransmission of the random access preamble, a CSI-RS with CSI-RS ID=4 is selected, and the power-related counter is maintained unchanged. In a second time of retransmission of the random access preamble, the CSI-RS with CSI-RS ID=3 is selected, and when only compared with the last time of transmission, the power-related counter is maintained unchanged; and when all transmissions are taken into account, the power-related counter is added by 1.

In addition, in the case of switch, in performing a certain time of resource selection, when all CSI-RS configured with specified random access resources do not satisfy the radio link quality conditions, a common random access resource to which the SSB corresponds may be selected for performing the retransmission of the random access preamble.

For example, in initial transmission of the random access preamble, a CSI-RS with CSI-RS ID=3 is selected. In a first time of retransmission of the random access preamble, a CSI-RS with CSI-RS ID=4 is selected, and the power-related counter is maintained unchanged. In a second time of retransmission of the random access preamble, an SSB with SSB index=1 is selected, and the power-related counter is maintained unchanged.

It can be seen from the above embodiment that whether to increase target received power is determined according to a change of either of a selected SSB and a selected CSI-RS. Hence, the selected CSI-RS is taken into account, and power is increased as necessary and useless retransmission is avoided, thereby increasing the success rate of random access and reducing power consumption of the UE. And furthermore, for the case where the same type of resources are selected currently and previously, such as SSBs or CSI-RS are selected currently and previously, reasonable processing may be performed.

Embodiment 4

The embodiment of this disclosure provides a method for determining power, applicable to a UE side.

Figure 6:
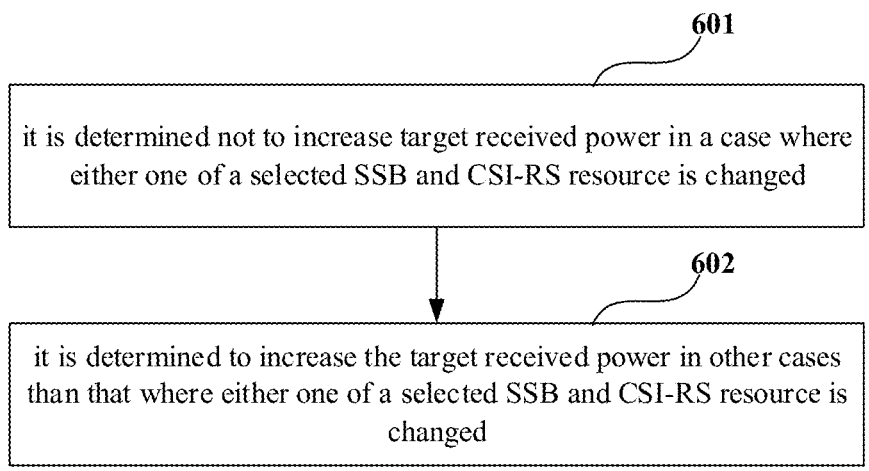
FIG. 6 is a schematic diagram of the method for determining power of Embodiment 4 of this disclosure.

FIG. 6 is a schematic diagram of the method for determining power of Embodiment 4 of this disclosure. As shown in FIG. 6, the method includes:

Step 601: it is determined not to increase target received power in a case where either one of a selected SSB and CSI-RS is changed; and Step 602: it is determined to increase the target received power in other cases than that where either one of a selected SSB and CSI-RS is changed.

In this embodiment, in determining whether a selected CSI-RS is changed, a quasi-co-location relationship between the CSI-RS and the SSB is not taken into account.

In this embodiment, for the case where either one of a selected SSB and CSI-RS is changed, reference may be made to what is described in Embodiment 1.

For example, the case where either one of a selected SSB and CSI-RS is changed may include any one of the following cases:

1) an SSB is currently selected, and an SSB is selected last time, but the two SSBs are different;
2) an SSB is currently selected, and the currently selected SSB is different from all previously selected SSBs;
3) a CSI-RS is currently selected, and a CSI-RS is selected last time, but the two CSI-RS are different; and
4) a CSI-RS is currently selected, and the currently selected CSI-RS is different from all previously selected CSI-RS.

In this embodiment, the methods for increasing the target received power and not increasing the target received power may be identical to those described in Embodiment 1, that is, whether a counter related to power ramping is added by 1 is determined according to whether the target received power is increased, and whether the counter is added by 1 or the counter is maintained unchanged is determined according to a result of determination.

In addition, a counter or parameter used in the method for calculating the target received power may be identical to that described in Embodiment 1, which shall not be described herein any further.

In addition, the method of this embodiment may further include steps of determining a notification of suspending the counter, and determining whether to increase the target received power according to the change of either one of the selected SSB and CSI-RS and whether the notification of suspending is received. A particular implementation method is identical to that described in Embodiment 1, which shall not be described herein any further.

The method of this embodiment shall be illustrated below for a scenario of switch.

In the case of switch, the network device may possibly only provide a specified random access resource and a random access preamble to which the CSI-RS corresponds for the user equipment, in which case CSI-RS satisfying radio link quality conditions will be selected preferentially. In this way, in all resource selection processes, it is a conventional situation that only CSI-RS are selected and SSBs are not selected.

For example, in initial transmission of the random access preamble, a CSI-RS with CSI-RS ID=3 is selected. In a first time of retransmission of the random access preamble, a CSI-RS with CSI-RS ID=4 is selected, and the power-related counter is maintained unchanged. In a second time of retransmission of the random access preamble, the CSI-RS with CSI-RS ID=3 is selected, and when only compared with the last time of transmission, the power-related counter is maintained unchanged; and when all transmissions are taken into account, the power-related counter is added by 1.

In addition, in the case of switch, in performing a certain time of resource selection, when all CSI-RS configured with specified random access resources do not satisfy the radio link quality conditions, a common random access resource to which the SSB corresponds may be selected for performing the retransmission of the random access preamble.

For example, in initial transmission of the random access preamble, a CSI-RS with CSI-RS ID=3 is selected. In a first time of retransmission of the random access preamble, a CSI-RS with CSI-RS ID=4 is selected, and the power-related counter is maintained unchanged. In a second time of retransmission of the random access preamble, an SSB with SSB index=1 is selected, and the power-related counter is added by 1.

It can be seen from the above embodiment that whether to increase target received power is determined according to a change of either of a selected SSB and a selected CSI-RS. Hence, the selected CSI-RS is taken into account, and power is increased as necessary and useless retransmission is avoided, thereby increasing the success rate of random access and reducing power consumption of the UE. And furthermore, for the case where the same type of resources are selected currently and previously, such as SSBs or CSI-RS are selected currently and previously, reasonable processing may be performed.

Embodiment 5

The embodiment of this disclosure provides a method for determining power, applicable to a UE side.

Figure 7:
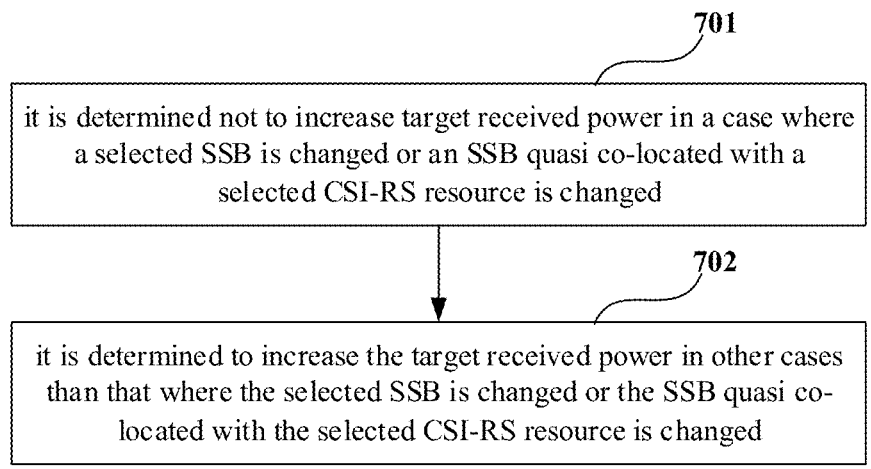
FIG. 7 is a schematic diagram of the method for determining power of Embodiment 5 of this disclosure.

FIG. 7 is a schematic diagram of the method for determining power of Embodiment 5 of this disclosure. As shown in FIG. 7, the method includes:

Step 701: it is determined not to increase target received power in a case where a selected SSB is changed or an SSB quasi co-located with a selected CSI-RS is changed; and Step 702: it is determined to increase the target received power in other cases than that where the selected SSB is changed or the SSB quasi co-located with the selected CSI-RS is changed.

In this embodiment, in determining whether a selected CSI-RS is changed, a quasi-co-location relationship between the CSI-RS and the SSB is taken into account.

In this embodiment, for the case where the selected SSB is changed or the SSB quasi co-located with the selected CSI-RS is changed, reference may be made to what is described in Embodiment 1.

For example, the case where the selected SSB is changed or the SSB quasi co-located with the selected CSI-RS is changed may include any one of the following cases:

1) an SSB is currently selected, and an SSB is selected last time, but the two SSBs are different;
2) an SSB is currently selected, and the currently selected SSB is different from all previously selected SSBs;
3) an SSB is currently selected, a CSI-RS is selected last time, and the currently selected SSB is different from an SSB quasi co-located with the CSI-RS selected last time; and
4) an SSB is currently selected, and the currently selected SSB is different from SSBs quasi co-located with all previously selected CSI-RS;
5) an SSB is currently selected, the currently selected SSB is different from all previously selected SSBs, and the currently selected SSB is different from SSBs quasi co-located with all previously selected CSI-RS;
6) a CSI-RS is currently selected, an SSB is selected last time, and an SSB quasi co-located with the currently selected CSI-RS is different from the SSB selected last time;
7) a CSI-RS is currently selected, and an SSB quasi co-located with the currently selected CSI-RS is different from all previously selected SSBs;
8) a CSI-RS is currently selected, a CSI-RS is selected last time, the currently selected CSI-RS is different from the CSI-RS selected last time, and an SSB quasi co-located with the currently selected CSI-RS is different from an SSB quasi co-located with the CSI-RS selected last time;
9) a CSI-RS is currently selected, the currently selected CSI-RS is different from all previously selected CSI-RS, and an SSB quasi co-located with the currently selected CSI-RS is different from SSBs quasi co-located with all previously selected CSI-RS;
10) a CSI-RS is currently selected, a CSI-RS is selected last time, the currently selected CSI-RS is different the CSI-RS selected last time, and an SSB quasi co-located with the currently selected CSI-RS is identical to an SSB co-located with the CSI-RS selected last time; for such a case, according to a predefined rule for determination, or according to rule for determination preconfigured by the network device, it may be deemed as that "an SSB quasi co-located with the selected CSI-RS is changed"; and furthermore, such a case may also be deemed as that "an SSB quasi co-located with the selected CSI-RS is not changed";
11) a CSI-RS is currently selected, the currently selected CSI-RS is different all previously selected CSI-RS, and an SSB quasi co-located with the currently selected CSI-RS is identical to an SSB co-located with at least one previously selected CSI-RS; for such a case, according to a predefined rule for determination, or according to rule for determination preconfigured by the network device, it may be deemed as that "an SSB quasi co-located with the selected CSI-RS is changed"; and furthermore, such a case may also be deemed as that "an SSB quasi co-located with the selected CSI-RS is not changed";
12) a CSI-RS is currently selected, an SSB quasi co-located with the currently selected CSI-RS is different from all previously selected SSBs and is different from all previously selected CSI-RS, and the SSB quasi co-located with the currently selected CSI-RS is different from SSBs quasi co-located with all previously selected CSI-RS;
13) a CSI-RS is currently selected, an SSB quasi co-located with the currently selected CSI-RS is different from all previously selected SSBs, the currently selected CSI-RS is different from all previously selected CSI-RS, and the SSB quasi co-located with the currently selected CSI-RS is different from SSBs quasi co-located with all previously selected CSI-RS; and
14) a CSI-RS is currently selected, an SSB quasi co-located with the currently selected CSI-RS is different from all previously selected SSBs and is different from all previously selected CSI-RS, and an SSB quasi co-located with the currently selected CSI-RS is identical to an SSB co-located with at least one previously selected CSI-RS; for such a case, according to a predefined rule for determination, or according to rule for determination preconfigured by the network device, it may be deemed as that "an SSB quasi co-located with the selected CSI-RS is changed"; and furthermore, such a case may also be deemed as that "an SSB quasi co-located with the selected CSI-RS is not changed".

Particular implementations of steps 701 and 702 shall be illustrated below.

In step 701, for example, it is determined not to increase the target received power when the currently selected SSB is different from the SSB selected last time, or, when the currently selected SSB is different from all the previously selected SSBs, or, when the currently selected SSB is different from the SSB quasi-colocated with the CSI-RS selected last time, or, when the currently selected SSB is different from the SSBs quasi-colocated with all the previously selected CSI-RS, or, when the currently selected SSB is different from all the previously selected SSBs and the currently selected SSB is different from the SSBs quasi-colocated with all the previously selected CSI-RS, or when the SSB quasi-colocated with the currently selected CSI-RS is different from the SSB selected last time, or when the SSB quasi-colocated with the currently selected CSI-RS is different from all previously selected SSBs, or, when the SSB quasi-colocated with the currently selected CSI-RS is different from the SSB quasi-co-located with the CSI-RS selected last time, or, when the SSB quasi-colocated with the currently selected CSI-RS is different from the SSBs quasi-co-located with all the previously selected CSI-RS, or, when the SSB quasi-colocated with the currently selected CSI-RS is different from all the previously selected SSBs, and the SSB quasi-colocated with the currently selected CSI-RS is different from the SSBs quasi-co-located with all the previously selected CSI-RS, or, when the currently selected CSI-RS is different from the CSI-RS selected last time, and the SSB quasi-colocated with the currently selected CSI-RS is identical to the SSB quasi-co-located with the CSI-RS selected last time, or, when the currently selected CSI-RS is different from all the previously selected CSI-RS, and the SSB quasi-colocated with the currently selected CSI-RS is identical to the SSB quasi-colocated with at least one previously selected CSI-RS, or, when the SSB quasi-colocated with the currently selected CSI-RS is different from all the previously selected SSBs and is different from all the previously selected CSI-RS, and the SSB quasi-colocated with the currently selected CSI-RS is different from the SSBs quasi-colocated with all the previously selected CSI-RS, or, when the SSB quasi-colocated with the currently selected CSI-RS is different from all the previously selected SSBs and is different from all the previously selected CSI-RS, and the SSB quasi-colocated with the currently selected CSI-RS is identical to the SSB quasi-colocated with at least one previously selected CSI-RS.

In step 702, for example, it is determined to increase the target received power when the currently selected SSB is identical the SSB selected last time, or, when the currently selected SSB is identical to at least one of all the previously selected SSBs, or, when the currently selected SSB is identical to the SSB quasi-colocated with the CSI-RS selected last time, or, when the currently selected SSB is identical to at least one of the SSBs quasi-colocated with all the previously selected CSI-RS, or, when the currently selected CSI-RS is identical to the CSI-RS selected last time, or when the currently selected CSI-RS is identical to at least one of all the previously selected CSI-RS, or when the currently selected CSI-RS is different from the CSI-RS selected last time, and the SSB quasi-colocated with the currently selected CSI-RS is identical to the SSB quasi-colocated with the CSI-RS selected last time, or, when the currently selected CSI-RS is different from all the previously selected CSI-RS, and the SSB quasi-co-located with the currently selected CSI-RS is identical to at least one of the SSBs quasi-co-located with all the previously selected CSI-RS, or, when the SSB quasi-colocated with the currently selected CSI-RS is identical to the SSB selected last time, or, when the SSB quasi-colocated with the currently selected CSI-RS is identical to at least one of all the previously selected SSBs, or, when the SSB quasi-colocated with the currently selected CSI-RS is different from all the previously selected SSBs and is different from all the previously selected CSI-RS, and the SSB quasi-colocated with the currently selected CSI-RS is identical to the SSB quasi-colocated with at least one previously selected CSI-RS.

In this embodiment, the methods for increasing the target received power and not increasing the target received power may be identical to those described in Embodiment 1, that is, whether a counter related to power ramping is added by 1 is determined according to whether the target received power is increased, and whether the counter is added by 1 or the counter is maintained unchanged is determined according to a result of determination.

In addition, a counter or parameter used in the method for calculating the target received power may be identical to that described in Embodiment 1, which shall not be described herein any further.

In addition, the method of this embodiment may further include steps of determining a notification of suspending the counter, and determining whether to increase the target received power according to the change of either one of the selected SSB and CSI-RS and whether the notification of suspending is received. A particular implementation method is identical to that described in Embodiment 1, which shall not be described herein any further.

The method of this embodiment shall be exemplarily described below in a scenario where the random access process is triggered due to beam failure recovery.

When the random access process is triggered due to beam failure recovery, the network device may simultaneously configure specified random access resources to which a CSI-RS and an SSB correspond for the beam failure recovery, and may further configure SSBs quasi co-located with some or all of the CSI-RS.

For example, when the random access preamble is initially transmitted, the MAC layer selects a random access resource to which the SSB with an SSB index=1 corresponds; and when the random access preamble is retransmitted for a first time, an MAC sub-layer selects a CSI-RS with a CSI-RS ID=3 (which is quasi co-located with an SSB with SSB index=1), and it may be deemed that the selected CSI-RS is not changed, and the counter related to power ramping is added by 1.

It can be seen from the above embodiment that whether to increase target received power is determined according to a change of either of a selected SSB and a selected CSI-RS. Hence, the selected CSI-RS is taken into account, and power is increased as necessary and useless retransmission is avoided, thereby increasing the success rate of random access and reducing power consumption of the UE. And furthermore, as a quasi co-location relationship between a CSI-RS and an SSB is taken into account, reasonable processing may be performed, regardless of what type of resources are selected currently.

Embodiment 6

The embodiment of this disclosure provides a method for determining power, which is applicable to a network side, and corresponds to the methods for determining power applicable to a UE side described in embodiments 1-5.

Figure 8:
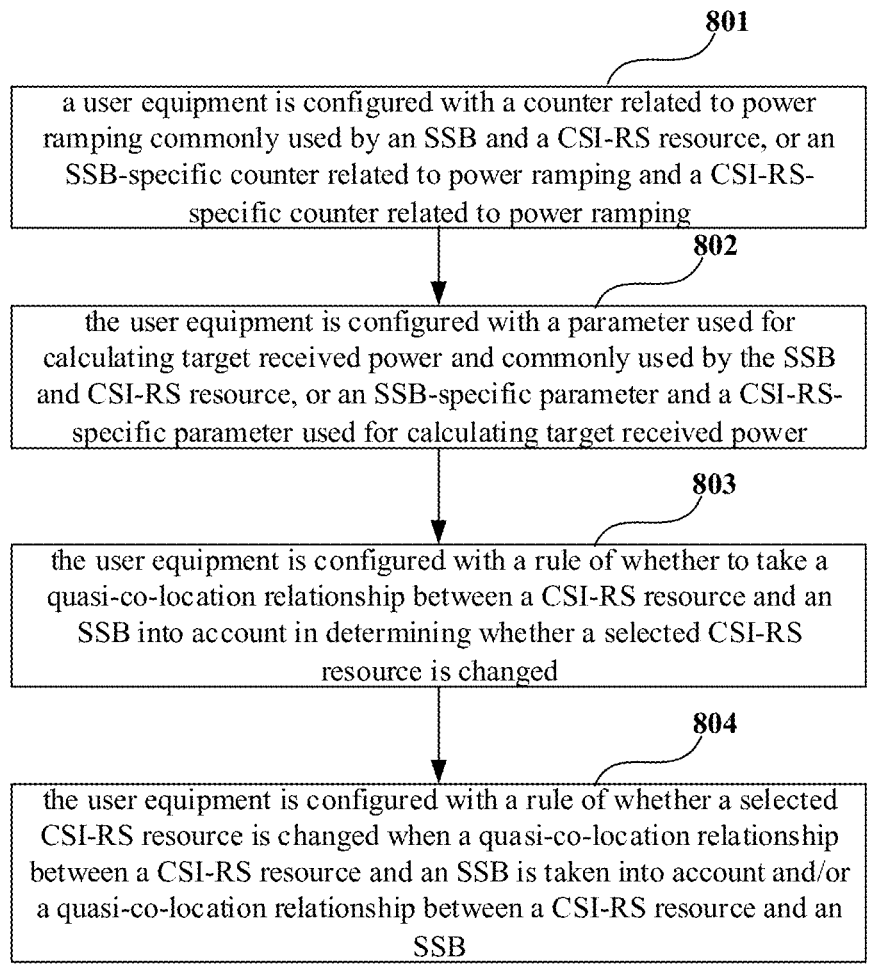
FIG. 8 is a schematic diagram of the method for determining power of Embodiment 6 of this disclosure.

FIG. 8 is a schematic diagram of the method for determining power of Embodiment 6 of this disclosure. As shown in FIG. 8, the method includes:

Step 801: a user equipment is configured with a counter related to power ramping commonly used by an SSB and a CSI-RS, or an SSB-specific counter related to power ramping and a CSI-RS-specific counter related to power ramping; and/or Step 802: the user equipment is configured with a parameter used for calculating target received power and commonly used by the SSB and CSI-RS, or an SSB-specific parameter and a CSI-RS-specific parameter used for calculating target received power.

For example, the SSB-specific parameter used for calculating target received power includes at least one of the following parameters: an SSB-specific preset step, an SSB-specific target received power initial value, and an SSB-specific preamble parameter;

and the CSI-RS-specific parameter used for calculating target received power includes at least one of the following parameters: a CSI-RS-specific preset step, a CSI-RS-specific target received power initial value, and a CSI-RS-specific preamble parameter.

In this embodiment, the network device configures the user equipment with the counter related to power ramping and/or the parameter used for calculating the target received power according to the above steps, so that the user equipment is able to use a related counter and parameter to calculate the target received power according to the configuration. For a particular calculation method, reference may be made to what is described in Embodiment 1, which shall not be described herein any further.

In this embodiment, for example, the method may further include:

Step 803: the user equipment is configured with a rule of whether to take a quasi-co-location relationship between a CSI-RS and an SSB into account in determining whether a selected CSI-RS is changed; and/or Step 804: the user equipment is configured with a rule of whether a selected CSI-RS is changed when a quasi-co-location relationship between a CSI-RS and an SSB is taken into account and/or a quasi-co-location relationship between a CSI-RS and an SSB.

For example, when a CSI-RS is currently selected, a CSI-RS is also selected last time, and the two CSI-RS are different, but an SSB quasi co-located with the currently selected CSI-RS is identical to an SSB quasi co-located with the CSI-RS selected last time, when the quasi-co-location relationship between a CSI-RS and an SSB is taken into account, it may be determined that the selected CSI-RS is not changed, or it may also be determined that the selected CSI-RS is changed, and the determining whether the selected CSI-RS is changed is regulated in the configured rule; and when the quasi-co-location relationship between a CSI-RS and an SSB is not taken into account, it may be determined that the selected CSI-RS is changed.

For another example, when a CSI-RS is currently selected, and the currently selected is different from all previously selected CSI-RS, but an SSB quasi co-located with the currently selected CSI-RS is identical to an SSB quasi co-located with at least one of all the previously selected CSI-RS, when the quasi-co-location relationship between a CSI-RS and an SSB is taken into account, it may be determined that the selected CSI-RS is not changed, or it may also be determined that the selected CSI-RS is changed, and the determining whether the selected CSI-RS is changed is regulated in the configured rule; and when the quasi-co-location relationship between a CSI-RS and an SSB is not taken into account, it may be determined that the selected CSI-RS is changed.

In this embodiment, the quasi co-location relationship may be configured via RRC-specific signaling.

And furthermore, the quasi co-location relationship may be configured via a measurement object configuration, and/or the quasi co-location relationship may be configured together with candidate beams.

In this embodiment, the quasi co-location relationship between the CSI-RS and the SSB may include: quasi co-location of the CSI-RS with any SSB; or there existing no quasi co-location relationship between the CSI-RS and all SSBs; or quasi co-location of the CSI-RS with at least one predefined or preconfigured SSB.

In this embodiment, an order of execution of steps 801-804 is not limited.

It can be seen from the above embodiment that by configuring the user equipment with the SSB and/or CSI-RS-related counters related to power ramping and/or the parameter for calculating the target received power, the user equipment is able to determine whether to increase the target received power according to the configuration and according to the change of either one of the selected SSB and CSI-RS, so that the selection of CSI-RS is taken into account, and the power ramping may be performed when necessary and useless retransmission may be avoided, thereby improving the success rate of random access and reducing power consumption of the UE.

Embodiment 7

The embodiment of this disclosure provides a method for determining power, which is applicable to a UE side and a network side, and corresponds to the methods for determining power described in embodiments 1-6, with repeated parts being not going to be described herein any further.

Figure 9:
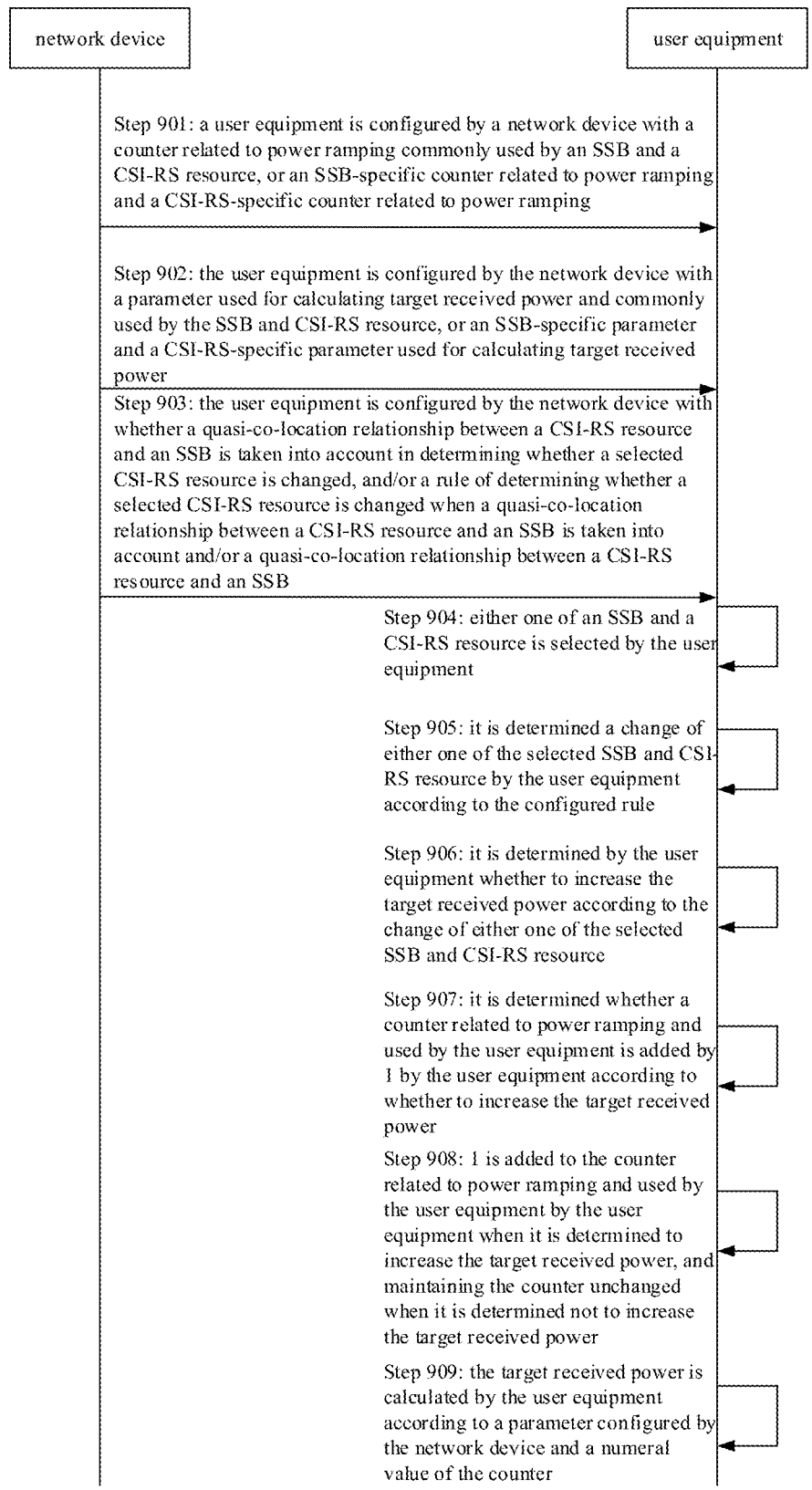
FIG. 9 is a schematic diagram of the method for determining power of Embodiment 7 of this disclosure.

FIG. 9 is a schematic diagram of the method for determining power of Embodiment 7 of this disclosure. As shown in FIG. 9, the method includes:

Step 901: a user equipment is configured by a network device with a counter related to power ramping commonly used by an SSB and a CSI-RS, or an SSB-specific counter related to power ramping and a CSI-RS-specific counter related to power ramping; and/or Step 902: the user equipment is configured by the network device with a parameter used for calculating target received power and commonly used by the SSB and CSI-RS, or an SSB-specific parameter and a CSI-RS-specific parameter used for calculating target received power;

Step 903: the user equipment is configured by the network device with whether a quasi-co-location relationship between a CSI-RS and an SSB is taken into account in determining whether a selected CSI-RS is changed, and/or a rule of determining whether a selected CSI-RS is changed when a quasi-co-location relationship between a CSI-RS and an SSB is taken into account and/or a quasi-co-location relationship between a CSI-RS and an SSB;

Step 904: either one of an SSB and a CSI-RS is selected by the user equipment;

Step 905: it is determined a change of either one of the selected SSB and CSI-RS by the user equipment according to the configured rule;

Step 906: it is determined by the user equipment whether to increase the target received power according to the change of either one of the selected SSB and CSI-RS;

Step 907: it is determined whether a counter related to power ramping and used by the user equipment is added by 1 by the user equipment according to whether to increase the target received power;

Step 908: 1 is added to the counter related to power ramping and used by the user equipment by the user equipment when it is determined to increase the target received power, and maintaining the counter unchanged when it is determined not to increase the target received power;

Step 909: the target received power is calculated by the user equipment according to a parameter configured by the network device and a numeral value of the counter.

In this embodiment, step 903 may be excluded, that is, the network device does not configure the rule, in which case the rule may be predefined, such as being defined in a standard. Therefore, in step 905, the user equipment may determine the change of either one of the selected SSB and CSI-RS according to the predefined rule.

Figure 10:
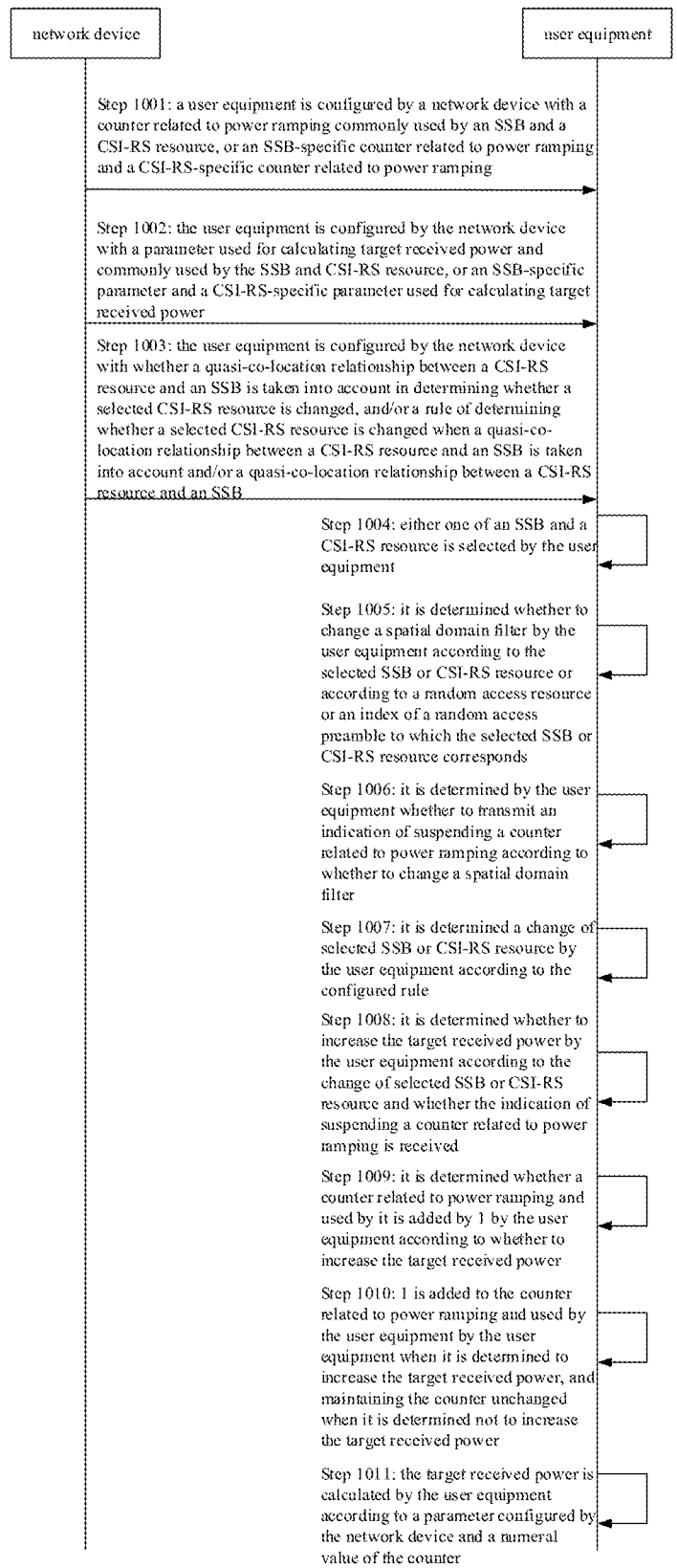
FIG. 10 is another schematic diagram of the method for determining power of Embodiment 7 of this disclosure.

FIG. 10 is another schematic diagram of the method for determining power of Embodiment 7 of this disclosure. As shown in FIG. 10, the method includes:

Step 1001: a user equipment is configured by a network device with a counter related to power ramping commonly used by an SSB and a CSI-RS, or an SSB-specific counter related to power ramping and a CSI-RS-specific counter related to power ramping; and/or Step 1002: the user equipment is configured by the network device with a parameter used for calculating target received power and commonly used by the SSB and CSI-RS, or an SSB-specific parameter and a CSI-RS-specific parameter used for calculating target received power;

Step 1003: the user equipment is configured by the network device with whether a quasi-co-location relationship between a CSI-RS and an SSB is taken into account in determining whether a selected CSI-RS is changed, and/or a rule of determining whether a selected CSI-RS is changed when a quasi-co-location relationship between a CSI-RS and an SSB is taken into account and/or a quasi-co-location relationship between a CSI-RS and an SSB;

Step 1004: either one of an SSB and a CSI-RS is selected by the user equipment;

Step 1005: it is determined whether to change a spatial domain filter by the user equipment according to the selected SSB or CSI-RS or according to a random access resource or an index of a random access preamble to which the selected SSB or CSI-RS corresponds;

Step 1006: it is determined by the user equipment whether to transmit a notification of suspending a counter related to power ramping according to whether to change a spatial domain filter;

Step 1007: it is determined a change of selected SSB or CSI-RS by the user equipment according to the configured rule;

Step 1008: it is determined whether to increase the target received power by the user equipment according to the change of selected SSB or CSI-RS and whether the notification of suspending a counter related to power ramping is received;

Step 1009: it is determined whether a counter related to power ramping and used by it is added by 1 by the user equipment according to whether to increase the target received power;

Step 1010: 1 is added to the counter related to power ramping and used by the user equipment by the user equipment when it is determined to increase the target received power, and maintaining the counter unchanged when it is determined not to increase the target received power;

Step 1011: the target received power is calculated by the user equipment according to a parameter configured by the network device and a numeral value of the counter.

In this embodiment, step 1003 may be excluded, that is, the network device does not configure the rule, in which case the rule may be predefined, such as being defined in a standard. Therefore, in step 1007, the user equipment may determine the change of either one of the selected SSB and CSI-RS according to the predefined rule.

In this embodiment, reference may be made to what is described in embodiments 1-6 for implementations of the above steps, which shall not be described herein any further.

It can be seen from the above embodiment that whether to increase target received power is determined according to a change of either of a selected SSB and a selected CSI-RS. Hence, the selected CSI-RS is taken into account, and power is increased as necessary and useless retransmission is avoided, thereby increasing the success rate of random access and reducing power consumption of the UE.

Embodiment 8

The embodiment of this disclosure provides an apparatus for determining power, applicable to a UE side. This apparatus corresponds to the methods for determining power described in embodiments 1-5, and reference may be made to Embodiment 1 for implementation of this apparatus, with repeated parts being not going to be described herein any further.

Figure 11:
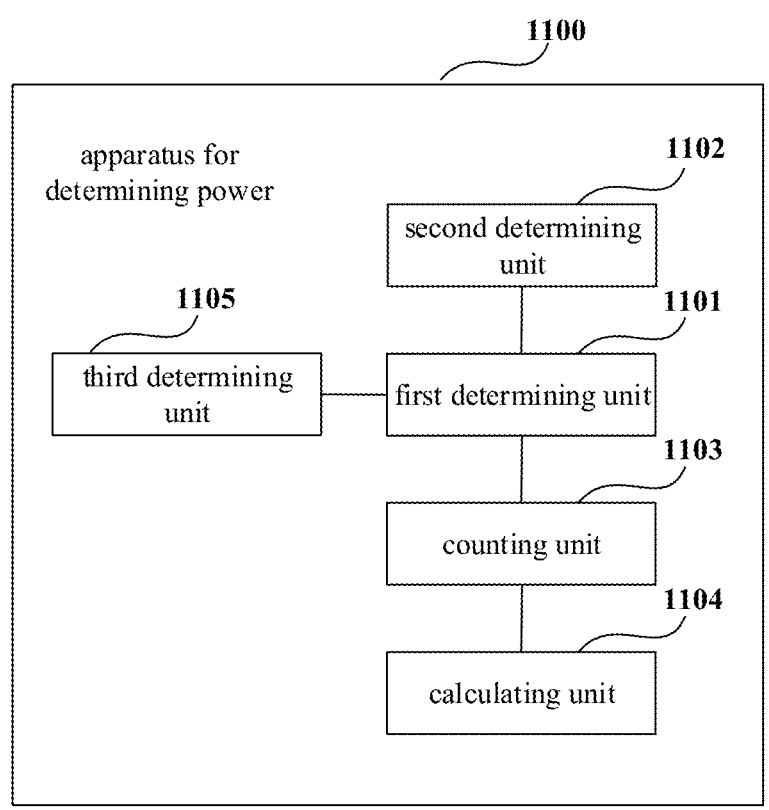
FIG. 11 is a schematic diagram of the apparatus for determining power of Embodiment 8 of this disclosure.

FIG. 11 is a schematic diagram of the apparatus for determining power of Embodiment 8 of this disclosure. As shown in FIG. 11, an apparatus 1100 for determining power includes:

a first determining unit 1101 configured to determine whether to increase target received power according to a change of either of a selected synchronization signal block (SSB) and a selected channel state information reference signal (CSI-RS);

the selected SSB or CSI-RS is used for determining a random access (RA) resource, and the target received power is used for determining transmitting power of a random access preamble.

In this embodiment, the apparatus 1100 may further include:

a second determining unit 1102 configured to determine a change of either the selected SSB or the selected CSI-RS according to a result of comparison of a currently selected SSB or CSI-RS with an SSB or CSI-RS selected last time, or according to a result of comparison of a currently selected SSB or CSI-RS with all previously selected SSBs and/or CSI-RS.

In this embodiment, the apparatus 1100 may further include:

a counting unit 1103 configured to, in a case where it is determined to increase the target received power, increment a counter related to power ramping commonly used by the SSB and the CSI-RS by 1, or increment an SSB-specific counter related to power ramping or a CSI-RS specific counter related to power ramping by 1; and a calculating unit 1104 configured to calculate the target received power according to a product of a difference between a numeral value of the counter related to power ramping and a preset value and a preset step, an initial value of the target received power and a preamble parameter.

In this embodiment, the apparatus 1100 may further include:

a third determining unit 1105 configured to, according to whether a spatial domain transmission filter is changed, determine whether to transmit a notification of suspending the counter related to power ramping;

in this case, the first determining unit 1101 is configured to, according to a change of either of the selected SSB and the CSI-RS and whether the notification of suspending the counter related to power ramping has been received, determine whether to increase the target received power.

In this embodiment, the third determining unit 1105 is optional.

Figure 12:
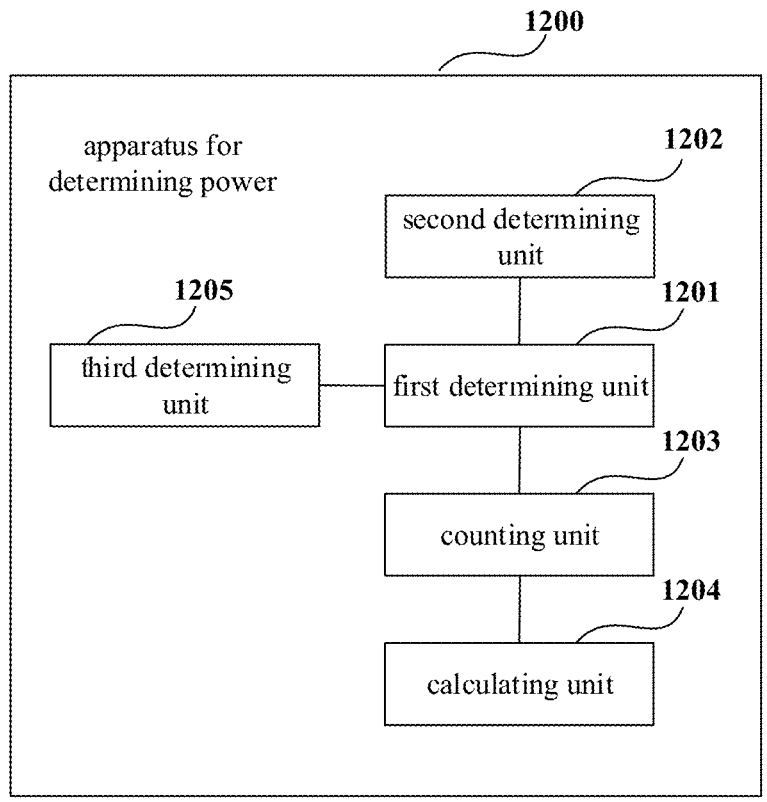
FIG. 12 is another schematic diagram of the apparatus for determining power of Embodiment 8 of this disclosure.

FIG. 12 is another schematic diagram of the apparatus for determining power of Embodiment 8 of this disclosure. As shown in FIG. 12, an apparatus 1200 for determining power includes:

a first determining unit 1201 configured to determine whether to increment a counter related to power ramping by 1 according to a change of either a selected SSB or CSI-RS.

In this embodiment, the apparatus 1200 may further include:

a second determining unit 1202 configured to determine the change of either the selected SSB or the selected CSI-RS according to a result of comparison of a currently selected SSB or CSI-RS with an SSB or CSI-RS selected last time, or according to a result of comparison of a currently selected SSB or CSI-RS with all previously selected SSBs and/or CSI-RS.

In this embodiment, the apparatus 1200 may further include:

a counting unit 1203 configured to maintain the counter related to power ramping according to a result of determination of the first determining unit 1201, i.e. adding 1 to the counter or maintaining the counter unchanged; and a calculating unit 1204 configured to calculate the target received power according to a product of a difference between a numeral value of the counter related to power ramping and a preset value and a preset step, an initial value of the target received power and a preamble parameter.

In this embodiment, the apparatus 1200 may further include:

a third determining unit 1205 configured to, according to whether a spatial domain transmission filter is changed, determine whether to transmit a notification of suspending the counter related to power ramping;

in this case, the first determining unit 1201 is configured to, according to a change of either of the selected SSB and the CSI-RS and whether the notification of suspending the counter related to power ramping has been received, determine whether to increase the target received power.

In this embodiment, reference may be made to the description of the steps in embodiments 1-5 for particular implementations of functions of the above functional units, which shall not be described herein any further.

It can be seen from the above embodiment that whether to increase target received power is determined according to a change of either of a selected SSB and a selected CSI-RS. Hence, the selected CSI-RS is taken into account, and power is increased as necessary and useless retransmission is avoided, thereby increasing the success rate of random access and reducing power consumption of the UE.

Embodiment 9

The embodiment of this disclosure provides an apparatus for determining power, applicable to a network device side. This apparatus corresponds to the method for determining power described in Embodiment 6, and reference may be made to Embodiment 6 for implementation of this apparatus, with repeated parts being not going to be described herein any further.

Figure 13:
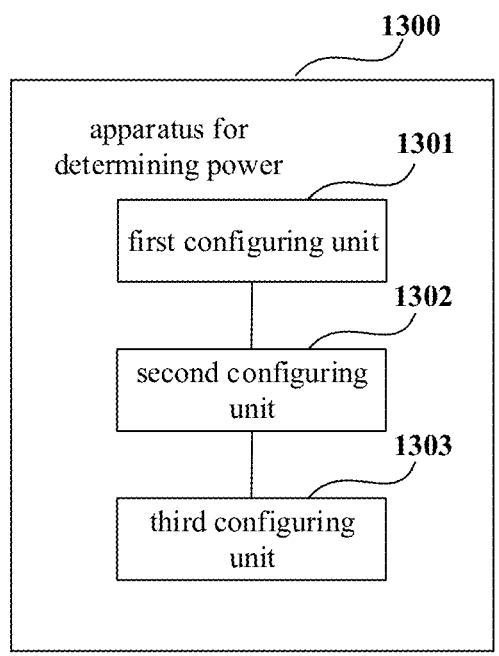
FIG. 13 is a schematic diagram of the apparatus for determining power of Embodiment 9 of this disclosure.

FIG. 13 is a schematic diagram of the apparatus for determining power of Embodiment 9 of this disclosure. As shown in FIG. 13, the apparatus 1300 for determining power includes:

a first configuring unit 1301 configured to configure UE with a counter related to power ramping commonly used by an SSB and a CSI-RS, or an SSB-specific counter related to power ramping and a CSI-RS specific counter related to power ramping; and/or a second configuring unit 1302 configured to configure the UE with a parameter used for calculating target received power and commonly used by the SSB and the CSI-RS, or an SSB-specific parameter used for calculating target received power and a CSI-RS specific parameter used for calculating target received power.

In this embodiment, the apparatus 1300 may further include:

a third configuring unit 1303 configured to configure the UE with a rule that whether a quasi co-location relationship between the CSI-RS and the SSB is taken into account in determining whether a selected CSI-RS is changed, and/or configure the UE with a rule for determining whether a selected CSI-RS is changed when the quasi co-location relationship between the CSI-RS and the SSB is taken into account and/or the quasi co-location relationship between the CSI-RS and the SSB.

In this embodiment, reference may be made to the description of the steps in Embodiment 6 for particular implementations of functions of the above functional units, which shall not be described herein any further.

It can be seen from the above embodiment that by configuring the user equipment with the SSB and/or CSI-RS-related counters related to power ramping and/or the parameter for calculating the target received power, the user equipment is able to determine whether to increase the target received power according to the configuration and according to the change of either one of the selected SSB and CSI-RS, so that the selection of CSI-RS is taken into account, and the power ramping may be performed when necessary and useless retransmission may be avoided, thereby improving the success rate of random access and reducing power consumption of the UE.

Embodiment 10

The embodiment of this disclosure provides a user equipment, including the apparatus for determining power described in Embodiment 8.

Figure 14:
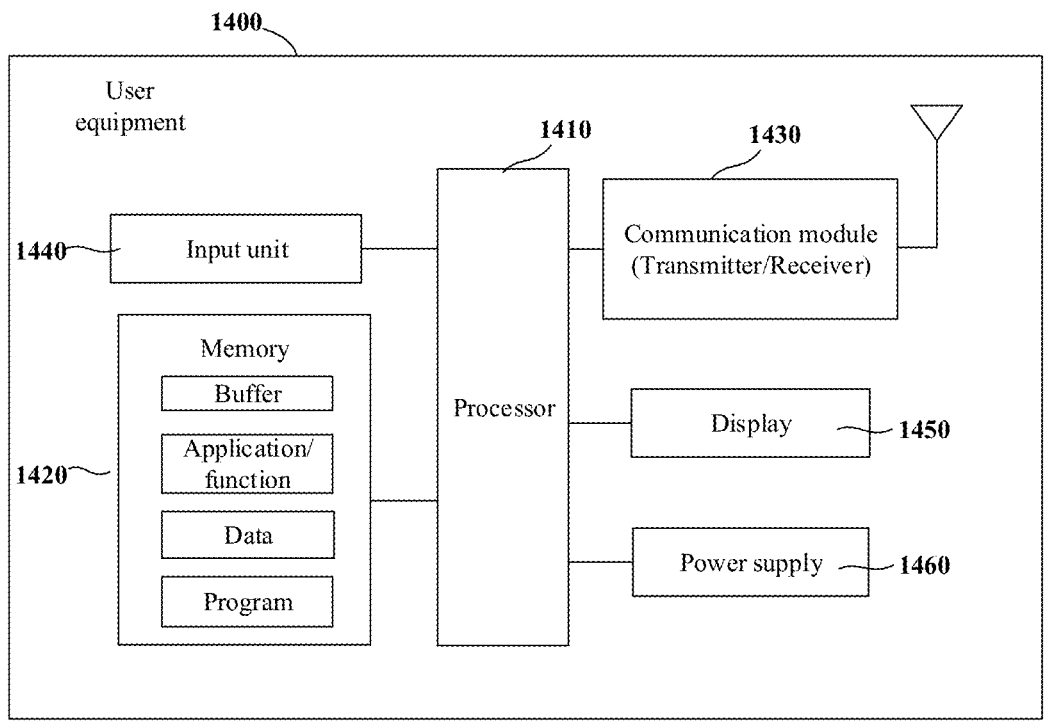
FIG. 14 is a block diagram of a systematic structure of the UE of Embodiment 10 of this disclosure.

FIG. 14 is a block diagram of a systematic structure of the UE of Embodiment 10 of this disclosure. As shown in FIG. 14, a user equipment 1400 may include a processor 1410 and a memory 1420, the memory 1420 being coupled to the processor 1410. It should be noted that this figure is illustrative only, and other types of structures may also be used, so as to supplement or replace this structure and achieve a telecommunications function or other functions.

In one implementation, functions of the apparatus for determining power may be integrated into the processor 1410. In this embodiment, the processor 1410 may be configured to: determine whether to increase target received power according to a change of either of a selected synchronization signal block (SSB) and a selected channel state information reference signal (CSI-RS); wherein the selected SSB or CSI-RS is used for determining a random access resource, and the target received power is used for determining transmitting power of a random access preamble.

For example, it is determined to increase the target received power when the selected SSB or the selected CSI-RS is not changed.

For example, it is determined not to increase the target received power in a case where the selected SSB is changed, and it is determined to increase the target received power in other cases than that where the selected SSB is changed.

For example, it is determined to increase the target received power in a case where the selected SSB or the selected CSI-RS is not changed, and it is determined not to increase the target received power in other cases than that where the selected SSB or the selected CSI-RS is not changed.

For example, it is determined not to increase the target received power in a case where either one of the selected SSB or CSI-RS is changed, and it is determined to increase the target received power in other cases than that where either one of the selected SSB or CSI-RS is changed.

For example, it is determined not to increase the target received power in a case where the selected SSB is changed or an SSB quasi co-located with the selected CSI-RS is changed, and it is determined to increase the target received power in other cases than that where the selected SSB is changed or an SSB quasi co-located with the selected CSI-RS is changed.

For example, the processor 1410 may further be configured to: in a case where it is determined to increase the target received power, increment a counter related to power ramping commonly used by the SSB and the CSI-RS by 1, or increment an SSB-specific counter related to power ramping or a CSI-RS specific counter related to power ramping by 1.

For example, the processor 1410 may further be configured to: calculate the target received power according to a product of a difference between a numeral value of the counter related to power ramping and a preset value and a preset step, an initial value of the target received power and a preamble parameter.

In another implementation, the apparatus for determining power and the processor 1410 may be configured separately; for example, the apparatus for determining power may be configured as a chip connected to the processor 1410, and the functions of the apparatus for determining power are executed under control of the processor 1410.

As shown in FIG. 14, the user equipment 1400 may further include a communication module 1430, an input unit 1440, a display 1450, and a power supply 1460. It should be noted that the user equipment 1400 does not necessarily include all the parts shown in FIG. 14. Furthermore, the user equipment 1400 may include parts not shown in FIG. 14, and the related art may be referred to.

As shown in FIG. 14, the processor 1410 is sometimes referred to as a controller or an operational control, which may include a microprocessor or other processor devices and/or logic devices. The processor 1410 receives input and controls operations of components of the user equipment 1400.

In this embodiment, the memory 1420 may be, for example, one or more of a buffer memory, a flash memory, a hard drive, a mobile medium, a volatile memory, a nonvolatile memory, or other suitable devices, which may store various data, etc., and furthermore, store programs executing related information. And the processor 1410 may execute programs stored in the memory 1420, so as to realize information storage or processing, etc. Functions of other parts are similar to those of the related art, which shall not be described herein any further. The parts of the user equipment 1400 may be realized by specific hardware, firmware, software, or any combination thereof, without departing from the scope of this disclosure.

It can be seen from the above embodiment that whether to increase target received power is determined according to a change of either of a selected SSB and a selected CSI-RS. Hence, the selected CSI-RS is taken into account, and power is increased as necessary and useless retransmission is avoided, thereby increasing the success rate of random access and reducing power consumption of the UE.

Embodiment 11

The embodiment of this disclosure provides a network device, including the apparatus for determining power described in Embodiment 9.

Figure 15:
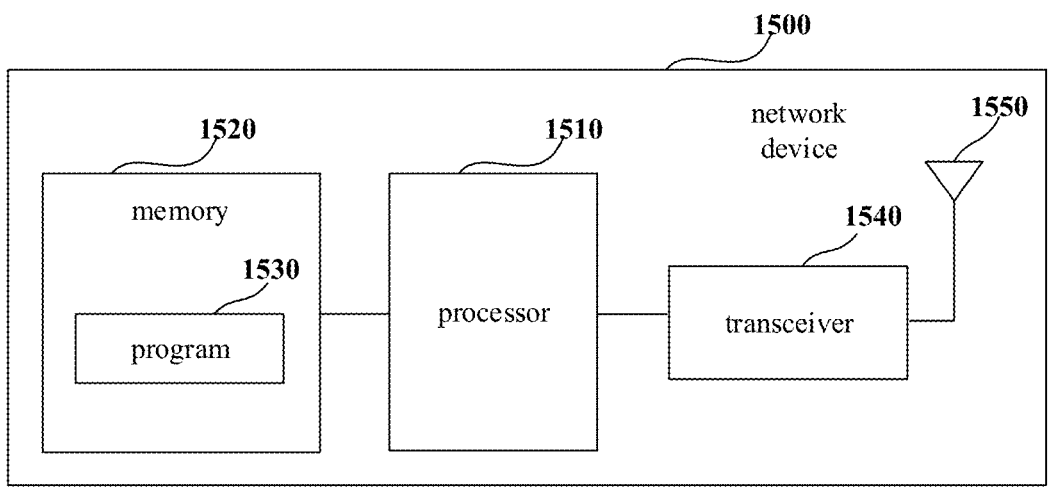
FIG. 15 is a schematic diagram of a structure of the network device of Embodiment 11 of this disclosure.

FIG. 15 is a schematic diagram of a structure of the network device of Embodiment 11 of this disclosure. As shown in FIG. 15, a network device 1500 may include a processor 1510 and a memory 1520, the memory 1520 being coupled to the processor 1510. In this embodiment, the memory 1520 may store various data, and furthermore, it may store a program 1530 for information processing, and execute the program 1530 under control of the processor 1510, so as to receive various information transmitted by a user equipment and transmit various information to the user equipment.

In one implementation, the functions of the apparatus for determining power may be integrated into the processor 1510. In this embodiment, the processor 1510 may be configured to: configure UE with a counter related to power ramping commonly used by an SSB and a CSI-RS, or an SSB-specific counter related to power ramping and a CSI-RS specific counter related to power ramping; and/or configure the UE with a parameter used for calculating target received power and commonly used by the SSB and the CSI-RS, or an SSB-specific parameter used for calculating target received power and a CSI-RS specific parameter used for calculating target received power.

For example, the processor 1510 may further be configured to: configure the UE with a rule that whether a quasi co-location relationship between the CSI-RS and the SSB is taken into account in determining whether a selected CSI-RS is changed, and/or configure the UE with a rule for determining whether a selected CSI-RS is changed when the quasi co-location relationship between the CSI-RS and the SSB is taken into account and/or the quasi co-location relationship between the CSI-RS and the SSB.

In another implementation, the apparatus for determining power and the processor 1510 may be configured separately; for example, the apparatus for determining power may be configured as a chip connected to the processor 1510, and the functions of the apparatus for determining power are executed under control of the processor 1510.

Furthermore, as shown in FIG. 15, the network device 1500 may include a transceiver 1540, and an antenna 1550, etc. Functions of the above components are similar to those in the related art, and shall not be described herein any further. It should be noted that the network device 1500 does not necessarily include all the parts shown in FIG. 15. Furthermore, the network device 1500 may include parts not shown in FIG. 15, and the related art may be referred to.

It can be seen from the above embodiment that by configuring the user equipment with the SSB and/or CSI-RS-related counters related to power ramping and/or the parameter for calculating the target received power, the user equipment is able to determine whether to increase the target received power according to the configuration and according to the change of either one of the selected SSB and CSI-RS, so that the selection of CSI-RS is taken into account, and the power ramping may be performed when necessary and useless retransmission may be avoided, thereby improving the success rate of random access and reducing power consumption of the UE.

Embodiment 12

The embodiment of this disclosure provides a communication system, including the user equipment described in Embodiment 10 and/or the network device described in Embodiment 11.

For example, reference may be made to FIG. 1 for a structure of the communication system. As shown in FIG. 1, the communication system 100 includes a network device 101 and a user equipment 102, the user equipment 102 is identical the user equipment described in Embodiment 10, and the network device 101 is identical the network device described in Embodiment 11, with repeated parts being not going to be described herein any further.

It can be seen from the above embodiment that by configuring the user equipment with the SSB and/or CSI-RS-related counters related to power ramping and/or the parameter for calculating the target received power, the user equipment is able to determine whether to increase the target received power according to the configuration and according to the change of either one of the selected SSB and CSI-RS, so that the selection of CSI-RS is taken into account, and the power ramping may be performed when necessary and useless retransmission may be avoided, thereby improving the success rate of random access and reducing power consumption of the UE.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in FIG. 11 may either correspond to software modules of procedures of a computer program, or correspond to hardware modules. Such software modules may respectively correspond to the steps shown in FIGS. 2 and 3. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, when equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the drawing may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawing may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the spirits and principle of the present disclosure, and such variants and modifications fall within the scope of the present disclosure.

As to implementations containing the above embodiments, following supplements are further disclosed.

Supplement 1. An apparatus for determining power, including:
a first determining unit configured to determine whether to increase target received power according to a change of either of a selected synchronization signal block (SSB) and a selected channel state information reference signal (CSI-RS);
the selected SSB or the selected CSI-RS is used for determining a random access resource, and the target received power is used for determining transmitting power of a random access preamble.

Supplement 2. The apparatus according to supplement 1, wherein, the first determining unit is configured to determine to increase the target received power when the selected SSB or the selected CSI-RS is not changed.

Supplement 3. The apparatus according to supplement 1 or 2, wherein, the first determining unit is configured to, in a case where the selected SSB is changed, determine not to increase the target received power,
and in other cases than that where the selected SSB is changed, determine to increase the target received power.

Supplement 4. The apparatus according to supplement 1 or 2, wherein,
the first determining unit is configured to,
in a case where the selected SSB or the selected CSI-RS is not changed, determine to increase the target received power,
and in other cases than that where the selected SSB or the selected CSI-RS is not changed, determine not to increase the target received power.

Supplement 5. The apparatus according to supplement 1 or 2, wherein,
the first determining unit is configured to,
in a case where either one of the selected SSB or CSI-RS is changed, determine not to increase the target received power,
and in other cases than that where either one of the selected SSB or CSI-RS is changed, determine to increase the target received power.

Supplement 6. The apparatus according to supplement 1 or 2, wherein,
the first determining unit is configured to,
in a case where the selected SSB is changed or an SSB quasi co-located (QCL'ed) with the selected CSI-RS is changed, determine not to increase the target received power,
and in other cases than that where the selected SSB is changed or an SSB quasi co-located with the selected CSI-RS is changed, determine to increase the target received power.

Supplement 7. The apparatus according to supplement 1, wherein,
the first determining unit is configured to, in a case where a type of the selected SSB is changed or a type of the selected CSI-RS is changed, or in a case where a type of the selected SSB or a type of the selected CSI-RS is not changed but a selected physical resource is changed, determine not to increase the target received power.

Supplement 8. The apparatus according to supplement 6, wherein, the first determining unit is configured to, in a case where a currently selected SSB is not changed from an SSB selected last time, or in a case where a currently selected SSB is not changed from at least one of all previously selected SSBs, or in a case where a currently selected SSB is identical to an SSB quasi co-located with a CSI-RS selected last time, or in a case where a currently selected SSB is identical to any one of SSBs quasi co-located with all previously selected CSI-RS, or in a case where a currently selected CSI-RS is identical to a CSI-RS selected last time, or in a case where a currently selected CSI-RS is identical to at least one of all previously selected CSI-RS, or in a case where a currently selected CSI-RS is different from a CSI-RS selected last time, and an SSB quasi co-located with the currently selected CSI-RS is identical to an SSB quasi co-located with the CSI-RS selected last time, or in a case where a currently selected CSI-RS is different from all previously selected CSI-RS, and an SSB quasi co-located with the currently selected CSI-RS is identical to at least one of SSBs quasi co-located with all previously selected CSI-RS, or in a case where an SSB quasi co-located with a currently selected CSI-RS is identical to an SSB selected last time, or in a case where an SSB quasi co-located with a currently selected CSI-RS is identical to at least one of all previously selected SSBs, or in a case where an SSB quasi co-located with a currently selected CSI-RS is different from all previously selected SSBs and is different from all previously selected CSI-RS, and the SSB quasi co-located with a currently selected CSI-RS is identical to an SSB quasi co-located with at least one previously selected CSI-RS, determine to increase the target received power.

Supplement 9. The apparatus according to supplement 6 or 8, wherein, the first determining unit is configured to, in a case where a currently selected SSB is changed from an SSB selected last time, or in a case where a currently selected SSB is changed from all previously selected SSBs, or in a case where a currently selected SSB is different from an SSB quasi co-located with a CSI-RS selected last time, or in a case where a currently selected SSB is different from SSBs quasi co-located with all previously selected CSI-RS, or in a case where a currently selected SSB is different from all previously selected SSBs and the currently selected SSB is different from SSBs quasi co-located with all previously selected CSI-RS, or in a case where an SSB quasi co-located with a currently selected CSI-RS is different from an SSB selected last time, or in a case where an SSB quasi co-located with a currently selected CSI-RS is different from all previously selected SSBs, or in a case where an SSB quasi co-located with a currently selected CSI-RS is different from an SSB quasi co-located with a CSI-RS selected last time, or in a case where an SSB quasi co-located with a currently selected CSI-RS is different from SSBs quasi co-located with all previously selected CSI-RS, or in a case where an SSB quasi co-located with a currently selected CSI-RS is different from all previously selected SSBs, and the SSB quasi co-located with the currently selected CSI-RS is different from SSBs quasi co-located with all previously selected CSI-RS, or in a case where a currently selected CSI-RS is different from a CSI-RS selected last time, and an SSB quasi co-located with the currently selected CSI-RS is identical to an SSB quasi co-located with the CSI-RS selected last time, or in a case where a currently selected CSI-RS is different from all previously selected CSI-RS, and an SSB quasi co-located with the currently selected CSI-RS is identical to an SSB quasi co-located with at least one previously selected CSI-RS, or in a case where an SSB quasi co-located with a currently selected CSI-RS is different from all previously selected SSBs and is different from all previously selected CSI-RS, and the SSB quasi co-located with the currently selected CSI-RS is different from SSBs quasi co-located with all previously selected CSI-RS, or in a case where an SSB quasi co-located with a currently selected CSI-RS is different from all previously selected SSBs and is different from all previously selected CSI-RS, and the SSB quasi co-located with the currently selected CSI-RS is identical to an SSB quasi co-located with at least one previously selected CSI-RS, determine not to increase the target received power.

Supplement 10. The apparatus according to any one of supplements 1-9, wherein the apparatus further includes:

a second determining unit configured to determine a change of either the selected SSB and the selected CSI-RS according to a result of comparison of a currently selected SSB or CSI-RS with an SSB or CSI-RS selected last time, or according to a result of comparison of a currently selected SSB or CSI-RS with all previously selected SSBs and/or CSI-RS.

Supplement 11. The apparatus according to any one of supplements 1-10, wherein the apparatus further includes:

a counting unit configured to, in a case where the first determining unit to determine to increase the target received power, increment a counter related to power ramping commonly used by the SSB and the CSI-RS by 1, or increment an SSB-specific counter related to power ramping or a CSI-RS specific counter related to power ramping by 1.

Supplement 12. The apparatus according to any one of supplements 1-11, wherein the apparatus further includes:

a calculating unit configured to calculate the target received power according to a product of a difference between a value of the counter related to power ramping and a pre-defined value and a configured step value, an initial value of the target received power and a parameter for preamble.

Supplement 13. The apparatus according to supplement 12, wherein,
in a case where the SSB-specific counter related to power ramping and/or the CSI-RS specific counter related to power ramping is/are used, the preset value is determined according to the number of used resource-specific counters related to power ramping, an initial value of the SSB specific counter related to power ramping and/or an initial value of the CSI-RS specific counter related to power ramping.

Supplement 14. The apparatus according to supplement 12, wherein,
the calculating unit is configured to calculate the target received power according to a product of the difference between a numeral value of the counter related to power ramping and the preset value and an SSB or CSI-RS specific preset step or a preset step commonly used by the SSB and the CSI-RS, an initial value of SSB or CSI-RS specific target received power or an initial value of target received power commonly used by the SSB and the CSI-RS, and an SSB or CSI-RS specific preamble parameter or a preamble parameter commonly used by the SSB and the CSI-RS.

Supplement 15. The apparatus according to any one of supplements 1-14, wherein the apparatus further includes:
a third determining unit configured to, according to whether a spatial domain transmission filter is changed, determine whether to transmit a notification of suspending the counter related to power ramping;
and the first determining unit is configured to, according to a change of either of the selected SSB and the CSI-RS and whether the notification of suspending the counter related to power ramping has been received, determine whether to increase the target received power.

Supplement 16. The apparatus according to supplement 15, wherein the apparatus further includes a transmitting unit,
in a case of random access preamble retransmission or in a case of random access preamble initial transmission or retransmission,
and before an MAC layer performs a random access preamble transmission procedure,
the transmitting unit is configured the MAC layer to transmit an index of the selected SSB or an ID of the selected CSI-RS or an index of the SSB quasi co-located with the selected CSI-RS to a physical layer, or
the transmitting unit is configured the MAC layer to transmit random access resource and an index of the random access preamble to which the selected SSB or the selected CSI-RS corresponds to a physical layer.

Supplement 17. An apparatus for determining power, including:
a first configuring unit configured to configure UE with a counter related to power ramping commonly used by an SSB and a CSI-RS, or an SSB-specific counter related to power ramping and a CSI-RS specific counter related to power ramping; and/or
a second configuring unit configured to configure the UE with a parameter used for calculating target received power and commonly used by the SSB and the CSI-RS, or an SSB-specific parameter used for calculating target received power and a CSI-RS specific parameter used for calculating target received power.

Supplement 18. The apparatus according to supplement 17, wherein,
the SSB-specific parameter used for calculating target received power includes at least one of the following parameters: an SSB-specific preset step, an initial value of SSB-specific target received power, and an SSB-specific preamble parameter;
and the CSI-RS specific parameter used for calculating target received power includes at least one of the following parameters: a CSI-RS specific preset step, an initial value of CSI-RS specific target received power, and a CSI-RS specific preamble parameter.

Supplement 19. The apparatus according to supplement 17 or 18, wherein the apparatus further includes:
a third configuring unit configured to configure the UE with a rule that whether a quasi co-location relationship between the CSI-RS and the SSB is taken into account in determining whether a selected CSI-RS is changed, and/or configure the UE with a rule for determining whether a selected CSI-RS is changed when the quasi co-location relationship between the CSI-RS and the SSB is taken into account and/or the quasi co-location relationship between the CSI-RS and the SSB.

Supplement 20. The apparatus according to supplement 19, wherein,
the quasi co-location relationship is configured via RRC-specific signaling.

Supplement 21. The apparatus according to supplement 19, wherein,
the quasi co-location relationship is configured via a measurement object configuration, and/or
the quasi co-location relationship is configured together with candidate beams.

Supplement 22. The apparatus according to supplement 19, wherein the quasi co-location relationship between the CSI-RS and the SSB includes:
quasi co-location of the CSI-RS with any SSB; or
there existing no quasi co-location relationship between the CSI-RS and all SSBs; or
quasi co-location of the CSI-RS with at least one pre-defined or preconfigured SSB.

Supplement 23. A user equipment, including the apparatus as described in any one of supplements 1-16.

Supplement 24. A network device, including the apparatus as described in any one of supplements 17-22.

Supplement 25. A communication system, including the user equipment as described in any supplement 23 and/or the user equipment as described in any supplement 24.

Supplement 26. A method for determining power, including:
determining whether to increase target received power according to a change of either of a selected synchronization signal block (SSB) and a selected channel state information reference signal (CSI-RS);
the selected SSB or CSI-RS is used for determining a random access (RA) resource, and the target received power is used for determining transmitting power of a random access preamble.

Supplement 27. The method according to supplement 26, wherein, it is determined to increase the target received power when the selected SSB or the selected CSI-RS is not changed.

Supplement 28. The method according to supplement 26 or 27, wherein,
it is determined not to increase the target received power in a case where the selected SSB is changed, and it is determined to increase the target received power in other cases than that where the selected SSB is changed.

Supplement 29. The method according to supplement 26 or 27, wherein, it is determined to increase the target received power in a case where the selected SSB or the selected CSI-RS is not changed, and it is determined not to increase the target received power in other cases than that where the selected SSB or the selected CSI-RS is not changed.

Supplement 30. The method according to supplement 26 or 27, wherein, it is determined not to increase the target received power in a case where either one of the selected SSB or the selected CSI-RS is changed, and it is determined to increase the target received power in other cases than that where either one of the selected SSB or the selected CSI-RS is changed.

Supplement 31. The method according to supplement 26 or 27, wherein, it is determined not to increase the target received power in a case where the selected SSB is changed or an SSB quasi co-located with the selected CSI-RS is changed, and it is determined to increase the target received power in other cases than that where the selected SSB is changed or an SSB quasi co-located with the selected CSI-RS is changed.

Supplement 32. The method according to supplement 26, wherein, in a case where a type of the selected SSB is changed or a type of the selected CSI-RS is changed, or in a case where a type of the selected SSB or a type of the selected CSI-RS is not changed but a selected physical resource is changed, it is determined not to increase the target received power.

Supplement 33. The method according to supplement 31, wherein, in a case where a currently selected SSB is not changed from an SSB selected last time, or in a case where a currently selected SSB is not changed from at least one of all previously selected SSBs, or in a case where a currently selected SSB is identical to an SSB quasi co-located with a CSI-RS selected last time, or in a case where a currently selected SSB is identical to any one of SSBs quasi co-located with all previously selected CSI-RS, or in a case where a currently selected CSI-RS is identical to a CSI-RS selected last time, or in a case where a currently selected CSI-RS is identical to at least one of all previously selected CSI-RS, or in a case where a currently selected CSI-RS is different from a CSI-RS selected last time, and an SSB quasi co-located with the currently selected CSI-RS is identical to an SSB quasi co-located with the CSI-RS selected last time, or in a case where a currently selected CSI-RS is different from all previously selected CSI-RS, and an SSB quasi co-located with the currently selected CSI-RS is identical to at least one of SSBs quasi co-located with all previously selected CSI-RS, or in a case where an SSB quasi co-located with a currently selected CSI-RS is identical to an SSB selected last time, or in a case where an SSB quasi co-located with a currently selected CSI-RS is identical to at least one of all previously selected SSBs, or in a case where an SSB quasi co-located with a currently selected CSI-RS is different from all previously selected SSBs and is different from all previously selected CSI-RS, and the SSB quasi co-located with a currently selected CSI-RS is identical to an SSB quasi co-located with at least one previously selected CSI-RS, it is determined to increase the target received power.

Supplement 34. The method according to supplement 31 or 33, wherein, in a case where a currently selected SSB is changed from an SSB selected last time, or in a case where a currently selected SSB is changed from all previously selected SSBs, or in a case where a currently selected SSB is different from an SSB quasi co-located with a CSI-RS selected last time, or in a case where a currently selected SSB is different from SSBs quasi co-located with all previously selected CSI-RS, or in a case where a currently selected SSB is different from all previously selected SSBs and the currently selected SSB is different from SSBs quasi co-located with all previously selected CSI-RS, or in a case where an SSB quasi co-located with a currently selected CSI-RS is different from an SSB selected last time, or in a case where an SSB quasi co-located with a currently selected CSI-RS is different from all previously selected SSBs, or in a case where an SSB quasi co-located with a currently selected CSI-RS is different from an SSB quasi co-located with a CSI-RS selected last time, or in a case where an SSB quasi co-located with a currently selected CSI-RS is different from SSBs quasi co-located with all previously selected CSI-RS, or in a case where an SSB quasi co-located with a currently selected CSI-RS is different from all previously selected SSBs, and the SSB quasi co-located with the currently selected CSI-RS is different from SSBs quasi co-located with all previously selected CSI-RS, or in a case where a currently selected CSI-RS is different from a CSI-RS selected last time, and an SSB quasi co-located with the currently selected CSI-RS is identical to an SSB quasi co-located with the CSI-RS selected last time, or in a case where a currently selected CSI-RS is different from all previously selected CSI-RS, and an SSB quasi co-located with the currently selected CSI-RS is identical to an SSB quasi co-located with at least one previously selected CSI-RS, or in a case where an SSB quasi co-located with a currently selected CSI-RS is different from all previously selected SSBs and is different from all previously selected CSI-RS, and the SSB quasi co-located with the currently selected CSI-RS is different from SSBs quasi co-located with all previously selected CSI-RS, or in a case where an SSB quasi co-located with a currently selected CSI-RS is different from all previously selected SSBs and is different from all previously selected CSI-RS, and the SSB quasi co-located with the currently selected CSI-RS is identical to an SSB quasi co-located with at least one previously selected CSI-RS, it is determined not to increase the target received power.

Supplement 35. The method according to any one of supplements 26-34, wherein the method further includes:

determining a change of either the selected SSB or the selected CSI-RS according to a result of comparison of a currently selected SSB or a currently selected CSI-RS with an SSB or a CSI-RS selected last time, or according to a result of comparison of a currently selected SSB or a currently selected CSI-RS with all previously selected SSBs and/or all previously selected CSI-RS.

Supplement 36. The method according to any one of supplements 26-35, wherein the method further includes:

in a case where it is determined to increase the target received power, adding 1 to a counter related to power ramping commonly used by the SSB and the CSI-RS, or adding 1 to an SSB-specific counter related to power ramping or a CSI-RS specific counter related to power ramping.

Supplement 37. The method according to any one of supplements 26-36, wherein the method further includes:

calculating the target received power according to a product of a difference between a numeral value of the counter related to power ramping and a preset value and a preset step, an initial value of the target received power and a preamble parameter.

Supplement 38. The method according to supplement 37, wherein, in a case where the SSB-specific counter related to power ramping and/or the CSI-RS specific counter related to power ramping is/are used, the preset value is determined according to the number of used resource-specific counters related to power ramping, an initial value of the SSB specific counter related to power ramping and/or an initial value of the CSI-RS specific counter related to power ramping.

Supplement 39. The method according to supplement 37, wherein, the target received power is calculated according to a product of the difference between a numeral value of the counter related to power ramping and the preset value and an SSB or CSI-RS specific preset step or a preset step commonly used by the SSB and the CSI-RS, an initial value of SSB or CSI-RS specific target received power or an initial value of target received power commonly used by the SSB and the CSI-RS, and an SSB or CSI-RS specific preamble parameter or a preamble parameter commonly used by the SSB and the CSI-RS.

Supplement 40. The method according to any one of supplements 26-39, wherein the method further includes:

according to whether a spatial domain transmission filter is changed, determining whether to transmit a notification of suspending the counter related to power ramping;

wherein whether to increase the target received power is determined according to a change of either one of the selected SSB or the selected CSI-RS and whether the notification of suspending the counter related to power ramping is received.

Supplement 41. The method according to supplement 40, wherein the method further includes:

in a case of random access preamble retransmission or in a case of random access preamble initial transmission or retransmission, and before an MAC layer starts to perform a random access preamble transmission procedure, transmitting an index of the selected SSB or an ID of the selected CSI-RS or an index of the SSB quasi co-located with the selected CSI-RS by the MAC layer to a physical layer, or transmitting a random access resource and an index of the random access preamble to which the selected SSB or the selected CSI-RS corresponds by the MAC layer to a physical layer.

Supplement 42. A method for determining power, including:

configuring UE with a counter related to power ramping commonly used by an SSB and a CSI-RS, or an SSB-specific counter related to power ramping and a CSI-RS specific counter related to power ramping; and/or configuring the UE with a parameter used for calculating target received power and commonly used by the SSB and the CSI-RS, or an SSB-specific parameter used for calculating target received power and a CSI-RS specific parameter used for calculating target received power.

Supplement 43. The method according to supplement 42, wherein, the SSB-specific parameter used for calculating target received power includes at least one of the following parameters: an SSB-specific preset step, an initial value of SSB-specific target received power, and an SSB-specific preamble parameter;

and the CSI-RS specific parameter used for calculating target received power includes at least one of the following parameters: a CSI-RS specific preset step, an initial value of CSI-RS specific target received power, and a CSI-RS specific preamble parameter.

Supplement 44. The method according to supplement 42 or 43, wherein the method further includes:

configuring the UE with a rule that whether a quasi co-location relationship between the CSI-RS and the SSB is taken into account in determining whether a selected CSI-RS is changed, and/or configuring the UE with a rule for determining whether a selected CSI-RS is changed when the quasi co-location relationship between the CSI-RS and the SSB is taken into account and/or the quasi co-location relationship between the CSI-RS and the SSB.

Supplement 45. The method according to supplement 44, wherein, the quasi co-location relationship is configured via RRC-specific signaling.

Supplement 46. The method according to supplement 44, wherein, the quasi co-location relationship is configured via a measurement object configuration, and/or the quasi co-location relationship is configured together with candidate beams.

Supplement 47. The method according to supplement 44, wherein the quasi co-location relationship between the CSI-RS and the SSB includes:

quasi co-location of the CSI-RS with any SSB; or there existing no quasi co-location relationship between the CSI-RS and all SSBs; or quasi co-location of the CSI-RS with at least one pre-defined or preconfigured SSB.

What is claimed is:

1. An apparatus for determining power, comprising:
a memory that stores a plurality of instructions;
a processor that couples to the memory and is configured to execute the instructions to:
select either a synchronization signal block (SSB) or a channel state information reference signal (CSI-RS) and determine whether to increase target received power according to a change of either of the selected SSB and the selected CSI-RS, wherein,
the selected CSI-RS is used for determining the random access resource, and the change of either of the selected SSB and the selected CSI-RS at least comprises, a second CSI-RS is selected for a last Random Access Preamble transmission; or a second SSB is selected for a last Random Access Preamble transmission; or
the selected SSB is used for determining the random access resource, and the change of either of the selected SSB and the selected CSI-RS at least comprises, a third CSI-RS is selected for a last Random Access Preamble transmission;
the target received power is used for determining transmitting power of a random access preamble.

2. The apparatus according to claim 1, wherein,
the processor is configured to determine to increase the target received power when the selected SSB or the selected CSI-RS is not changed.

3. The apparatus according to claim 1, wherein,
the processor is configured to,
in a case where the selected SSB is changed, determine not to increase the target received power,
and in other cases than that where the selected SSB is changed, determine to increase the target received power.

4. The apparatus according to claim 1, wherein,
the processor is configured to,
in a case where the selected SSB or the selected CSI-RS is not changed, determine to increase the target received power,
and in other cases than that where the selected SSB or the selected CSI-RS is not changed, determine not to increase the target received power.

5. The apparatus according to claim 1, wherein,
the processor is configured to,
in a case where either one of the selected SSB or the selected CSI-RS is changed, determine not to increase the target received power,
and in other cases than that where either one of the selected SSB or the selected CSI-RS is changed, determine to increase the target received power.

6. The apparatus according to claim 1, wherein,
the processor is configured to,
in a case where the selected SSB is changed or an SSB quasi co-located with the selected CSI-RS is changed, determine not to increase the target received power,
and in other cases than that where the selected SSB is changed or an SSB quasi co-located with the selected CSI-RS is changed, determine to increase the target received power.

7. The apparatus according to claim 1, wherein the processor is further configured to:
determine a change of either the selected SSB or the selected CSI-RS according to a result of comparison of a currently selected SSB or a currently selected CSI-RS with an SSB or a CSI-RS selected last time, or according to a result of comparison of a currently selected SSB or a currently selected CSI-RS with all previously selected SSBs and/or all previously selected CSI-RS.

8. The apparatus according to claim 1, wherein the processor is further configured to:
in a case where it is determined to increase the target received power, increment a counter related to power ramping commonly used by the SSB and the CSI-RS by 1, or increment an SSB-specific counter related to power ramping or a CSI-RS specific counter related to power ramping by 1.

9. The apparatus according to claim 1, wherein the processor is further configured to:
calculate the target received power according to a product of a difference between a numeral value of the counter related to power ramping and a preset value and a preset step, an initial value of the target received power and a preamble parameter.

10. The apparatus according to claim 9, wherein,
in a case where the SSB-specific counter related to power ramping and/or the CSI-RS specific counter related to power ramping is/are used, the preset value is determined according to the number of used resource-specific counters related to power ramping, an initial value of the SSB specific counter related to power ramping and/or an initial value of the CSI-RS specific counter related to power ramping.

11. The apparatus according to claim 9, wherein,
the processor is configured to calculate the target received power according to a product of the difference between a numeral value of the counter related to power ramping and the preset value and an SSB or CSI-RS specific preset step or a preset step commonly used by the SSB and the CSI-RS, an initial value of SSB or CSI-RS specific target received power or an initial value of target received power commonly used by the SSB and the CSI-RS, and an SSB or CSI-RS specific preamble parameter or a preamble parameter commonly used by the SSB and the CSI-RS.

12. The apparatus according to claim 1, wherein the processor is further configured to:
according to whether a spatial domain transmission filter is changed, determine whether to transmit a notification of suspending the counter related to power ramping;
according to a change of either of the selected SSB and the selected CSI-RS and whether the notification of suspending the counter related to power ramping has been received, determine whether to increase the target received power.

13. The apparatus according to claim 12, wherein the processor is further configured to:
in a case of random access preamble retransmission or in a case of random access preamble initial transmission or retransmission,
and before an MAC layer starts to perform a random access preamble transmission procedure,
the processor is configured the MAC layer to transmit an index of the selected SSB or an ID of the selected CSI-RS or an index of the SSB quasi co-located with the selected CSI-RS to a physical layer, or
the processor is configured the MAC layer to a transmit random access resource and an index of the random access preamble to which the selected SSB or the selected CSI-RS corresponds to a physical layer.

14. A UE, comprising the apparatus as claimed in claim 1.

15. An apparatus for determining power, comprising:
a memory that stores a plurality of instructions;
a processor that couples to the memory and is configured to execute the instructions to:
configure UE with a counter related to power ramping commonly used by a synchronization signal block (SSB) and a channel state information reference signal (CSI-RS);
wherein the processor is further configured to:
configure the UE with a rule that whether a quasi co-location relationship between the CSI-RS and the SSB is taken into account in determining whether a selected CSI-RS is changed, and/or configure the UE with a rule for determining whether a selected CSI-RS is changed when the quasi co-location relationship between the CSI-RS and the SSB is taken into account and/or the quasi co-location relationship between the CSI-RS and the SSB.

16. The apparatus according to claim 15, wherein,
the quasi co-location relationship is configured via RRC-specific signaling.

17. The apparatus according to claim 15, wherein,
the quasi co-location relationship is configured via a measurement object configuration, and/or
the quasi co-location relationship is configured together with candidate beams.

18. The apparatus according to claim 15, wherein the quasi co-location relationship between the CSI-RS and the SSB comprises:
quasi co-location of the CSI-RS with any SSB; or
there existing no quasi co-location relationship between the CSI-RS and all SSBs; or
quasi co-location of the CSI-RS with at least one pre-defined or preconfigured SSB.

* * * * *